United States Patent
Kimura et al.

(10) Patent No.: US 7,345,983 B2
(45) Date of Patent: Mar. 18, 2008

(54) OPTICAL PICK-UP DEVICE AND OPTICAL INFORMATION RECORDING REPRODUCING APPARATUS

(75) Inventors: Tohru Kimura, Hachioji (JP); Eiji Nomura, Hachioji (JP); Nobuyoshi Mori, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 548 days.

(21) Appl. No.: 10/949,279

(22) Filed: Sep. 27, 2004

(65) Prior Publication Data

US 2005/0088952 A1    Apr. 28, 2005

(30) Foreign Application Priority Data

Sep. 30, 2003    (JP)    ............... 2003-340268

(51) Int. Cl.
  *G11B 7/00*    (2006.01)
(52) U.S. Cl. .............. 369/112.23; 369/112.08; 369/44.23
(58) Field of Classification Search .......... 369/112
  See application file for complete search history.

(56) References Cited

U.S. PATENT DOCUMENTS

| | | | |
|---|---|---|---|
| 5,901,131 A * | 5/1999 | Ootaki et al. .......... | 369/112.02 |
| 5,910,937 A * | 6/1999 | Akiba et al. ............. | 369/53.2 |
| 6,172,957 B1 * | 1/2001 | Ogasawara ............. | 369/94 |
| 6,292,453 B1 * | 9/2001 | Ichimura et al. ........ | 369/112.24 |
| 6,628,582 B2 * | 9/2003 | Furukawa ............... | 369/44.32 |
| 6,661,750 B2 * | 12/2003 | Saimi et al. ............. | 369/44.23 |
| 6,721,259 B1 * | 4/2004 | Yamamoto et al. ..... | 369/112.26 |
| 6,728,179 B1 * | 4/2004 | Nakano et al. .......... | 369/53.1 |
| 6,870,805 B1 * | 3/2005 | Arai et al. ............... | 369/112.07 |
| 2003/0185134 A1 * | 10/2003 | Kimura et al. .......... | 369/112.08 |
| 2003/0202451 A1 * | 10/2003 | Kimura et al. .......... | 369/112.08 |
| 2004/0032815 A1 * | 2/2004 | Kim et al. ............... | 369/112.26 |
| 2004/0213131 A1 * | 10/2004 | Kimura et al. .......... | 369/112.03 |
| 2004/0218502 A1 * | 11/2004 | Kim et al. ............... | 369/112.01 |

* cited by examiner

*Primary Examiner*—Wayne Young
*Assistant Examiner*—Van T. Pham
(74) *Attorney, Agent, or Firm*—Finnegan, Henderson, Farabow, Garrett & Dunner, L.L.P.

(57) ABSTRACT

An optical pickup apparatus includes: first-third light sources; a packaged multiple light source unit for packaging emitting points of at least two of the first-third light sources in one housing; an objective optical system for converging light fluxes emitted by light sources onto information recording surfaces of at least three kinds of optical disks; and a magnification adjusting optical unit having an actuator and a movable lens group and being arranged in an optical path between the packaged multiple light source unit and the objective optical system, wherein the movable lens group is driven by the actuator along the optical axis so as to change a magnification of the objective optical system according to a wavelength of a light flux emitted by the packaged multiple light source unit.

14 Claims, 7 Drawing Sheets

OPTICAL PICK-UP DEVICE AND OPTICAL INFORMATION RECORDING REPRODUCING APPARATUS

BACKGROUND OF THE INVENTION

The present invention relates to an optical pick-up device and an optical information recording reproducing apparatus.

Recently, DVD (Digital Versatile Disk) which is rapidly spreading as an optical recording medium of the image information or the like, can record the information of 4.7 GB per one surface when the red semiconductor laser of wavelength 650 nm and an objective optical system of a numerical aperture (NA) 0.65 are used. However, for the purpose that the information of higher density is recorded/reproduced at a high transfer rate, a requirement of further high densification and a much increase of capacity becomes strong. As universally well-known, for the purpose to attain the high densification and much increase of capacity of optical disk, it is sufficient when a diameter of a spot light-converged in the objective optical system is reduced, and for that, a reduction of wavelength of the laser light source or a high increase of numerical aperture of the objective optical system, is necessary.

Relating to the reduction of wavelength of the laser light source, a blue violet-semiconductor laser of wavelength 405 nm, or a blue violet SHG laser is putting in practical use, and by a combination of these blue violet laser light sources and the objective optical system of NA 0.65, for an optical disk of 12 cm diameter, the information of about 15 GB can be recorded per one surface. (hereinafter, in the present specification, an optical disk using the blue violet laser light source is named generally as "high density optical disk").

Further, as for the much increase of NA of the objective optical system, a standard of optical disk by-which the light flux from the blue violet laser light source is light-converged by the objective optical system of NA 0.85 and the recording/reproducing of the information is conducted, is proposed, and in the optical disk of this standard, the information of about 23 GB per one surface can be recorded for the optical disk of 12 cm diameter.

Hereupon, in the high density optical disk using the objective optical system of NA 0.85, because the coma generated due to a skew of the optical disk is increased, the protective layer is designed thinner than in a case of DVD (thickness of the disk is 0.1 mm, while thickness of DVD is 0.6 mm), and the coma amount to the skew is decreased.

However, only by saying that the information can be adequately recorded/reproduced for such a high density optical disk, it can not be said that the value as a product of the optical disk player is sufficient. In the present time, when it is based on the actuality that for example, DVD or CD (Compact Disc) in which various information is recorded, is put in the market, it is not sufficient only in a case where the recording/reproducing of the information can be conducted on the high density optical disk. For example, a fact that the recording/reproducing of the information can be conducted adequately in the same manner also on the DVD or CD which are owned by the user, leads to an increase of the value of goods as the optical disk player for the high density optical disk. From such a background, it is required for an optical pick-up device mounted in the optical disk player for the high density optical disk that, while it keeps a compatibility also for any one of the high density optical disk, DVD, and CD, it has a performance by which the recording/reproducing of the information can be adequately conducted.

As a method by which, while it has a compatibility also for any one of the high density optical disk, DVD, and CD, the recording/reproducing of the information can be adequately conducted, a method by which optical parts for the high density optical disk, and optical parts for DVD or CD, are selectively switched corresponding to the recording density of the optical disk for which the information is recorded/reproduced, can be considered. However, because a plurality of optical parts are necessary, it is disadvantageous for the size reduction, and further, cost is increased.

Accordingly, in order to intend that the structure of the optical pick-up device is simplified, and the cost is reduced, also in the optical pick-up device having the compatibility, it is preferable that the optical parts for the high density optical disk and the optical parts for DVD or CD are commonly used with each other, and the number of optical parts structuring the optical pick-up device is decreased to the utmost, and it can be said that it is most preferable that the objective optical system is used in common with each other.

Further, following the recent price-reduction of the optical disk player, the cost reduction of the optical pick-up device is advanced. It conducts the effort to reduce the number of optical parts structuring the optical pick-up device to the utmost in each of manufacturers. In such a movement, as the optimum laser light source for the optical pick-up device having the compatibility for a plurality of kinds of optical disks in which the wavelength for the recording/reproducing is different from each other, a laser light source in which a light-emitting point which light-emits the laser light flux whose wavelength is different, is formed in one chip, is developing. Hereupon, in the present specification, a laser light source in which a plurality of light-emitting points whose oscillation wavelengths are different from each other, are housed in one casing, is referred to "packaged multiple light source unit". It includes the light source unit in which a plurality of light-emitting points whose oscillation wavelengths are different from each other, are formed on one chip, and a light source unit in which a plurality of light sources whose oscillation wavelengths are different from each other, are housed in one casing.

An objective optical system which can be used in combination with the packaged multiple light source unit in which, in such a manner, the light-emitting points are provided closely, is disclosed in the following reference document (Patent Document 1). In this objective optical system, for the purpose that the laser light flux of wavelength 660 nm and the laser light flux of wavelength 785 nm, projected from closely provided light-emitting point, are converged onto the information recording surface of DVD and CD respectively, the magnifications of the objective optical system for respective wavelengths, are set to almost equal.

(Patent Document 1) Tokkai 2001-76367

However, a problem that, in the objective optical system having the compatibility for three kinds of optical disks of the high density optical disk, DVD and CD, when the magnifications of the objective optical system to respective wavelengths are set to almost equal, because the degree of freedom of the optical design which can be used for the improvement of optical characteristic, is taken, in a process of the optical design of the objective optical system, good optical performances for respective wavelengths can not be obtained, is actualized.

SUMMARY OF THE INVENTION

The above problem is considered, and an object of the present invention is to provide an optical pick-up device provided with the objective optical system having the compatibility for a plurality of kinds of optical disks such as the high density optical disk, DVD and CD, in which the wavelength of laser light source is different. An optical pick-up device which is advantageous for the cost reduction, and size reduction by using the laser light source by which a plurality of laser light fluxes whose wavelength is different from each other, can be light-emitted, without sacrificing the degree of freedom of the optical design of the objective optical system.

Further, another object of the present invention is to provide an optical information recording reproducing apparatus in which this optical pick-up device is mounted.

In order to solve the above problem, the optical pick-up device of the present invention is provided with a packaged multiple light source unit in which, in at least 2 light sources of the first light source to the third light source, respective light-emitting points are housed in a casing and a magnification adjusting optical unit structured by: an actuator; and a movable lens group driven in the optical axis direction by the actuator. The movable lens group changes the magnification of the objective optical unit, corresponding to the wavelength of light flux projected from the packaged multiple light source unit, when it is driven in the optical axis direction by the actuator. Thereby, even when the objective optical system in which the magnifications to respective wavelengths are different from each other, is mounted, the packaged multiple light source unit can be used. It realizes cost reduction and size reduction, by the reduction of the number of optical parts of the optical pick-up device.

DETAILED DESCRIPTION OF THE PREFERRED EMBODIMENT

Figure 1:
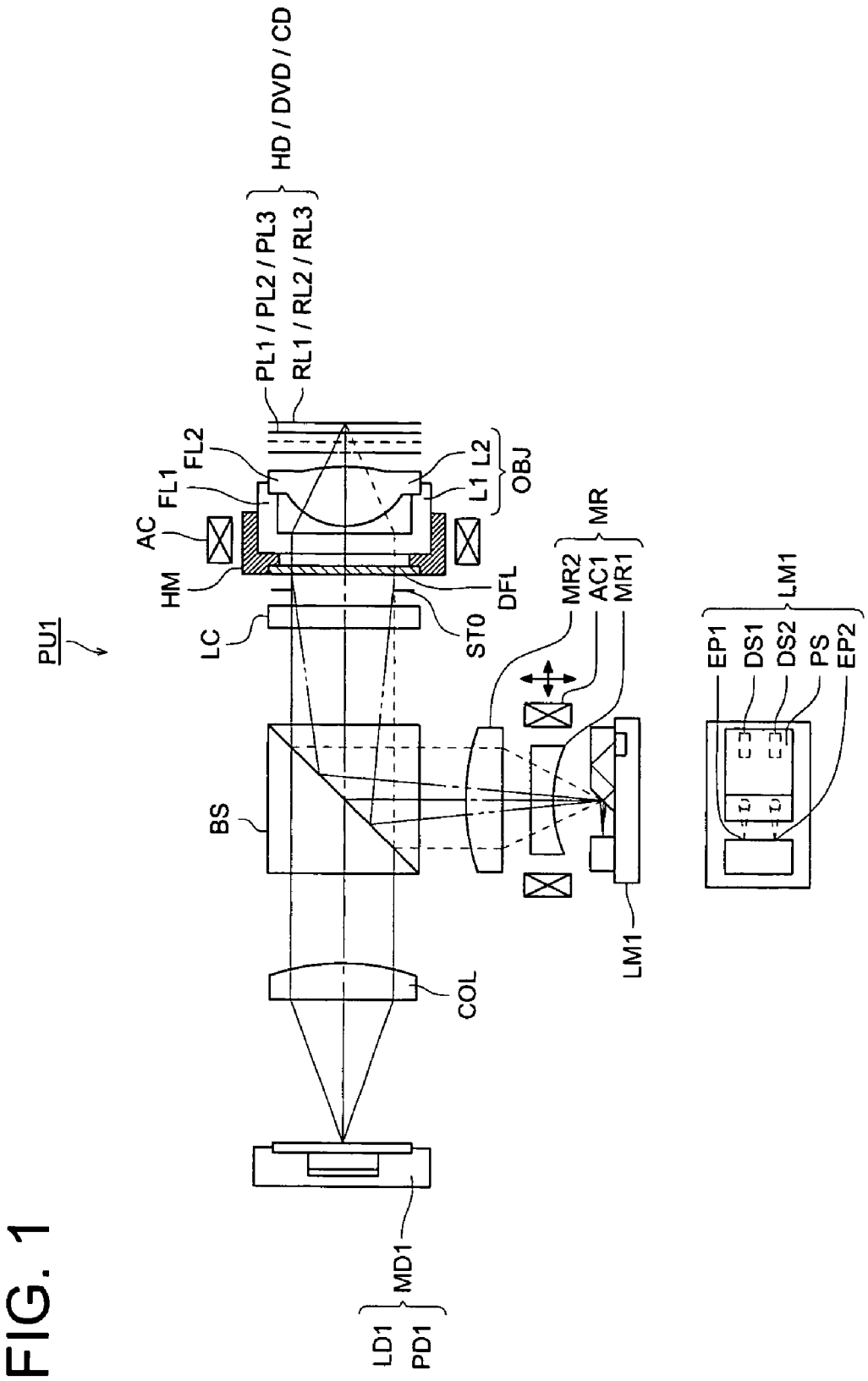
FIG. 1 is a main portion plane view showing a structure of an optical pick-up device.

Preferred embodiments of the present invention will be described below.

A structure written in item 1 is structured in such a manner that, an optical pick-up device includes: a first light source for emitting a first light flux with a wavelength $\lambda 1$; a second light source for emitting a second light flux with a wavelength $\lambda 2$ which is longer than the wavelength $\lambda 1$; a third light source for emitting a third light flux with wavelength $\lambda 3$ which is longer than the wavelength $\lambda 2$; a packaged multiple light source unit for packaging emitting points of at least two of the first-third light sources in one housing; an objective optical system for converging light fluxes emitted by at least three kinds of light sources respectively having different wavelengths $\lambda 1$, $\lambda 2$ and $\lambda 3$ onto information recording surfaces of at least three kinds of optical disks respectively having different information recording densities; and a magnification adjusting optical unit having an actuator and a movable lens group and being arranged in an optical path between the packaged multiple light source unit and the objective optical system, wherein the movable lens group is driven by the actuator along the optical axis so as to change a magnification of the objective optical system according to a wavelength of a light flux emitted by the packaged multiple light source unit.

According to the structure written in item 1, when at least one lens group in the composition lens groups of the magnification adjusting optical unit arranged in the optical path between the packaged multiple light source unit and the objective optical system, is driven in the optical axis direction by the actuator, the divergent angle of the light fluxes whose wavelengths are different from each other, emitted from the packaged multiple light source unit can be converted into an angle corresponding to the magnification of the objective optical system to respective wavelengths. This is the same meaning as in a case where, corresponding to the wavelength of light flux projected from the packaged multiple light source unit, the magnification of the objective optical system is changed by the movable lens group.

Thereby, even when the objective optical system in which the magnifications to respective wavelengths are different from each other, is mounted, the packaged multiple light source unit can be used. It realizes cost reduction and size reduction by the reduction of the number of optical parts.

In the present specification, an optical disk using the blue violet semiconductor laser or blue violet SHG laser as the light source for the recording/reproducing of the information, is generally named as "high density optical disk". It includes an optical disk of a standard in which the recording/reproducing of the information is conducted by the objective optical system of NA 0.85 and the thickness of a protective layer is about 0.1 mm, and an optical disk of a standard in which the recording/reproducing of the information is conducted by the objective optical system of NA 0.65 and the thickness of a protective layer is about 0.6 mm. Further, it also includes an optical disk having such a protective layer on its information recording surface, an optical disk having the protective layer of thickness of about several to several tens nm on the information recording surface, or an optical disk in which thickness of these protective layers or the protective films is 0. Further, in the present specification, the high density optical disk includes a photo-magnetic disk using the blue violet semiconductor laser or blue violet SHG laser as the light source for the recording/reproducing of the information.

Further, in the present specification, optical disks of DVD series such as DVD-ROM, DVD-Video, DVD-Audio, DVD-RAM, DVD-R, DVD-RW, DVD+R, DVD+RW, are generally named as "DVD", and optical disks of CD series such as CD-ROM, CD-Audio, CD-Video, CD-R, CD-RW, are generally named as "CD".

A structure written in item 2 is structured in such a manner that, in the optical pick-up device written in item 1, the movable lens group is structured by at least 2 lens groups, and in these lens groups, at least one lens group is driven in an optical axis direction by the actuator.

A structure written in item 3 is structured in such a manner that, in the optical pick-up device written in item 2, the movable lens group includes at least one negative lens group and at least one positive lens group.

In the case where an object point position of the objective optical system to respective wavelengths is changeably adjusted in the optical axis direction, when the movement amount of the movable lens group is too large, a problem that a size of the optical pick-up device is increased, is caused. Accordingly, as in the structure written in item 2, when the movable lens group includes two or more lens groups, it reduces the movement amount of the movable lens group. It realizes the size reduction of the optical pick-up device.

Further, for that purpose, as the structure written in item 3, it is more preferable that the movable lens group includes at least one negative lens group and at least one positive lens group.

A structure written in item 4 is structured such that, in the optical pick-up device written in any one of item 1 to item 3, the packaged multiple light source unit provides emitting points of the second light source and the third light source.

According to the structure written in item 4, a laser light source (for example, GH30707A2D made by Sharp Co.) in which light emitting points projecting, for example, the light flux whose wavelength is in the vicinity of 655 nm and the light flux whose wavelength is in the vicinity of 785 nm, are formed on one chip, can be used.

A structure written in item 5 is structured in such a manner that, in the optical pick-up device written in any one of item 1 to item 4, the optical pickup device records and/or reproduces information on optical disks using light fluxes with different wavelengths emitted by the packaged multiple light source unit separately, wherein the optical disks have protective layers with different thicknesses for protecting the information recording surfaces, the movable lens group is driven by the actuator along the optical axis so as to correct a spherical aberration caused by a thickness difference between the protective layers.

A structure written in item 6 is structured in such a manner that, in the optical pick-up device written in any one of item 1 to item 5, the optical pickup device records and/or reproduces information on optical disks using light fluxes with different wavelengths emitted by the packaged multiple light source unit separately, an optical disk having a maximum information recording density among the optical disks comprises a multilayer structure in which optically transparent layers and information recording surfaces are laminated alternately, the movable lens group is driven by an actuator along the optical axis so as to correct a spherical aberration which is occurred when a focus of the objective lens jumps from i-th information recording surface to j-th information recording surface, when a first information recording surfaces, a second information recording surface through n-th information recording surface are arranged in the multilayer structure comprises in this order from the packaged multiple light source unit side.

A structure written in item 7 is structured in such a manner that, in the optical pick-up device written in any one of item 1 to item 6, the objective optical system has at least one plastic lens and the movable lens group is driven by the actuator along the optical axis so as to correct a spherical aberration which comes from a refractive index variation or a refractive index distribution resulting from an environmental temperature change of a plastic lens in the objective optical system.

A structure written in item 8 is structured in such a manner that, in the optical pick-up device written in any one of item 1 to item 7, the movable lens group is driven by the actuator along the optical axis so as to correct a spherical aberration in the objective optical system which comes from a wavelength difference between light fluxes having different wavelengths respectively emitted by the packaged multiple light source unit.

A structure written in item 9 is structured in such a manner that, in the optical pick-up device written in any one of item 1 to item 8, the movable lens group is driven by the actuator along the optical axis so as to correct a spherical aberration which comes from a chromatic aberration of the objective optical system in case that a light flux have the smallest wavelength among light fluxes with different wavelengths emitted by the packaged multiple light source unit separately and the smallest wavelength of the light flux changes in a range of ±10 nm.

The movable lens group is structured so that it can be driven in the optical axis direction by the actuator and it provides a function by which the object point position is changeably adjusted in the optical axis direction corresponding to the magnification of the objective optical system, as in the invention written in item 5 and a function by which the spherical aberration due to the difference of the thickness of protective layers, or as in the invention written in item 6, the spherical aberration generated at the time of focus-jump between layers of multi-layer disk, is corrected.

Hereupon, the spherical aberration generated due to the focus-jump between the information recording surfaces of multi-layer disk, is generated by way of parameters of the distance between the information recording surfaces, image side numerical aperture of the objective optical system, and wavelength at the time of the recording/reproducing. These parameters are determined by a standard of optical disk. Accordingly, the spherical aberration generated at the time of the focus-jump, because its amount is determined by the kind of optical disk, the movement amount of the movable lens group required at the time, is uniquely determined by the kind of optical disk and the specification of the movable lens group. That is, at the time of the focus-jump between the information recording surfaces of the multi-layer disk, it is desirable that the kind of optical disk and a direction of the focus-jump (for example, from the first information recording surface to the second information recording surface, or from the second information recording surface to the first information recording surface) are detected, and the movable lens group is moved by a predetermined amount in the direction determined by that result.

Further, it may have a function written in item 7 such that the spherical aberration due to the refractive index change and/or refractive index distribution following the environmental temperature change of the plastic lens in the objective optical system is corrected, or a function written in item 8 such that the spherical aberration generated in the objective optical system due to the wavelength difference of the light fluxes whose wavelengths are different from each other, projected from the packaged multiple light source unit, is corrected, or a function written in item 9 such that the spherical aberration generated due to the chromatic aberration of the objective optical system when the wavelength of the light flux having the shortest wavelength changes within the range of ±10 nm, for example, due to the production error of the light-emitting point, is corrected. Hereupon, the spherical aberration generated due to the wavelength dispersion by the production error of the light-emitting point is solved when the position of the movable lens group is adjusted, in the production process of the optical pick-up device. Therefore it is not necessary that it is corrected at the time of the recording/reproducing on the optical disk.

A structure written in item 10 is structured in such a manner that, in the optical pick-up device written in any one of item 1 to item 9, the movable lens group is further driven to be shifted in the direction perpendicular to the optical axis, and/or driven to be tilted to the optical axis, by the actuator.

A structure written in item 11 is structured in such a manner that, in the optical pick-up device written in item 10, the movable lens group is driven to be shifted in a perpendicular direction to the optical axis and/or to be tilted against the optical axis by the actuator so as to reduce a comatic aberration caused by tracking the objective optical system.

According to the structure written in item 11, the coma generated by the tracking drive of the objective optical system can be cancelled out by the coma generated by the shift-drive and/or tilt-drive of the movable lens group.

A structure written in item 12 is structured in such a manner that, in the optical pick-up device written in item 10 or 11, the movable lens group is driven to shift and/or tilt by the actuator so as to reduce a comatic aberration resulting from a tilt of the optical disk.

According to the structure written in item 12, the coma generated by the tilt of the optical disk can be cancelled out by the coma generated by the shift-drive and/or tilt-drive of the movable lens group.

A structure written in item 13 is structured in such a manner that, in the optical pick-up device written in any one of item 10 to 12, the movable lens group is driven to be shifted in the direction perpendicular to the optical axis and/or driven to be tilted to the optical axis following the rotation of the optical disk by the actuator.

A structure written in item 14 is structured in such a manner that the optical pick-up device written in any one of item 1 to 13 is mounted.

According to the structure written in item 14, the same effect as any one of item 1 to 13 is obtained.

The present invention provides an optical pick-up device which includes an objective optical system having the compatibility for a plurality of kinds of optical disks such as the high density optical disk, DVD, and CD, in which the wavelengths of laser light source are different and an optical information recording reproducing apparatus in which this optical pick-up device is mounted. The optical pick-up device has an advantage for the cost reduction and size reduction by using the laser light sources which can emit a plurality of laser light fluxes whose wavelengths are different from each other, without sacrificing the degree of freedom of the optical design of the objective optical system.

Referring to the drawings, the best mode for carrying out the present invention will be detailed below. Hereupon, when magnifications for the first light flux, second light flux, the third light flux of the objective optical system OBJ in optical pick-up devices PU1-PU4 which will be described below, are respectively made m1, m2, m3, in the optical pick-up devices PU1 and PU4, m1=m2=0, m3<0, and in the optical pick-up devices PU2 and PU3, m1=0, m3<m2<0.

The First Embodiment

FIG. 1 is a view schematically showing a structure of the first optical pick-up device PU1 in which the recording/reproducing of the information can be adequately conducted also on any one of the high density optical disk HD (the first optical disk), DVD (the second optical disk) and CD (the third optical disk). The optical specification of the high density optical disk HD is, wavelength $\lambda1=408$ nm, thickness t1 of the protective layer PL1=0.0875 mm, numerical aperture NA1=0.85, the optical specification of DVD is, wavelength $\lambda2=658$ nm, thickness t2 of the protective layer PL2=0.6 mm, numerical aperture NA2=0.67, and the optical specification of CD is, wavelength $\lambda3=785$ nm, thickness t3 of the protective layer PL3=1.2 mm, numerical aperture NA3=0.51. However, a combination of the wavelength, thickness of the protective layer, and numerical aperture is not limited to this.

The optical pick-up device PU1 is structured by: a module MD1 for a high density optical disk HD which integrates the blue violet semiconductor laser LD1 which emits the laser light flux (the first light flux) of wavelength 408 nm when the recording/reproducing of the information is conducted on the high density optical disk, and a light detector PD1; a laser module LM1 for DVD/CD (packaged multiple light source unit) including the first light-emitting point EP1 which emits the laser light flux (the second light flux) of wavelength 658 nm when the recording/reproducing of the information is conducted on DVD, the second light-emitting point EP2 which emits the laser light flux (the second light flux) of wavelength 785 nm when the recording/reproducing of the information is conducted on CD, first light receiving section DS1 which light-receives the reflected light flux from the information recording surface RL2 of DVD, second light receiving section DS2 which light-receives the reflected light flux from the information recording surface RL3 of CD, and a prism PS; a magnification adjusting optical unit composed of a movable lens group composed of 2 lenses of a plastic lens (the first lens MR1) whose paraxial refractive power is negative, and a plastic lens (the second lens MR2) whose paraxial refractive power is positive, and the first lens drive-use actuator AC1; objective optical system OBJ composed of an aberration correction element L1, and light-converging element L2 both surfaces of which are aspheric surfaces, having a function by which the laser light flux transmitted this aberration correction element L1 is light-converged on the information recording surfaces RL1, RL2, RL3; 2-axis actuator AC2; liquid crystal element LC; polarizing beam splitter BS; collimator lens COL; and stop STO.

Hereupon, the liquid crystal element LC is an element by which the spherical aberration generated at the time of focus jump between the information recording surfaces of the high density optical disk HD, the spherical aberration generated in the objective optical system OBJ due to the refractive index change/refractive index distribution following the environmental temperature change, and the spherical aberration generated in the objective optical system OBJ due to the wavelength dispersion by the production error of the blue violet semiconductor laser LD1 are corrected.

In the optical pick-up device PU1, when the recording/reproducing of the information is conducted on the high density optical disk HD, as its path of ray is shown by a solid line in FIG. 1, initially, the blue violet semiconductor laser LD1 is light-emitted. After the divergent light flux projected from the blue violet semiconductor laser LD1 is converted into the parallel light flux when it transmits the collimator lens COL, it passes in order the polarizing beam splitter BS, liquid crystal element LC, and becomes a spot formed on the information recording surface RL1 by the objective optical system OBJ, through the protective layer PL1 of the high density optical disk HD.

Hereupon, the detailed description of the objective optical system will be made later.

Then, the objective optical system OBJ conducts the focusing or tracking by the 2-axis actuator AC arranged in its periphery. The reflected light flux modulated by an information pit on the information recording surface RL1, passes again the objective optical system OBJ, liquid crystal element LC, polarizing beam splitter BS, collimator lens COL, and is converged on the light-receiving surface of the light detector PD1. Then, by using the output signal of the light detector PD1, the information recorded in the high density optical disk HD can be read.

Further, when the recording/reproducing of the information is conducted on DVD, initially, the first lens is moved so that an interval between the first lens MR1 and the second lens MR2 is a predetermined distance, by the first lens drive-use actuator AC1.

Then, as the path of ray is shown by a dotted line in FIG. 1, the first light-emitting point EP1 is light-emitted. The divergent light flux projected from the first light-emitting point EP1, after it is reflected by the prism PS, when it passes the first lens MR1 and the second lens MR2, is converted into the parallel light flux, reflected by the polarizing beam splitter BS, passes the liquid crystal element LC, and by the objective optical system OBJ, becomes a spot formed on the information recording surface RL2 through the protective layer PL2 of DVD.

Then, the objective optical system OBJ conducts the focusing or tracking by the 2-axis actuator AC2 arranged in its periphery. The reflected light flux modulated by an information pit on the information recording surface RL2 passes again the objective optical system OBJ, polarizing beam splitter BS, and liquid crystal element LC, and is branched by the polarizing beam splitter BS, passes the second lens MR2, first lens MR1, and after it is reflected two times in the prism PS, it is converged on the light-receiving surface of the first light-receiving section DS1.

Then, by using the output signal of the first light-receiving section DS1, the information recorded in DVD can be read.

Further, when the recording/reproducing of the information is conducted on CD, initially, by the first lens drive-use actuator AC1, the first lens is moved so that an interval between the first lens MR1 and the second lens MR2 is a predetermined distance, specifically, so that it is shorter than at the time of the recording/reproducing on DVD.

Then, as the path of ray is shown by a two-dotted chain line in FIG. 1, the second light-emitting point EP2 is light-emitted. The divergent light flux projected from the second light-emitting point EP2, after it is reflected by the prism PS, when it passes the first lens MR1 and the second lens MR2, is converted into the divergent light flux corresponding to the magnification m3 to the wavelength $\lambda 3$ of the objective optical system OBJ, reflected by the polarizing beam splitter BS, passes the liquid crystal element LC, and by the objective optical system OBJ, becomes a spot formed on the information recording surface RL3 through the protective layer PL3 of CD.

Then, the objective optical system OBJ conducts the focusing or tracking by the 2-axis actuator AC2 arranged in its periphery. The reflected light flux modulated by an information pit on the information recording surface RL3 passes again the objective optical system OBJ, polarizing beam splitter BS, and liquid crystal element LC, and is branched by the polarizing beam splitter BS, passes the second lens MR2, first lens MR1, and after it is reflected two times in the prism PS, it is converged on the light-receiving surface of the second light-receiving section DS2.

Then, by using the output signal of the second light-receiving section DS2, the information recorded in CD can be read.

Next, the structure of the objective optical system OBJ will be described. Hereupon, the objective optical system OBJ is the same structure in also the second-the fourth embodiment which will be described later.

Figures 2A, 2B, 2C:
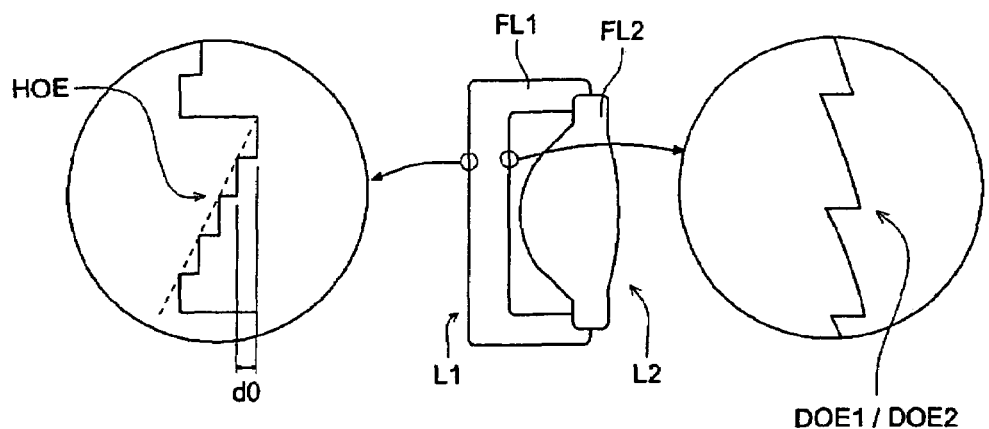
FIGS. 2(a) to (c) are views showing a structure of an objective lens.

The objective optical system OBJ is, as shown in FIG. 2(b), composed of the aberration correction element L1 and a light-converging element L2 having a function by which the laser light flux transmitted this aberration correction element L1 is light-converged on the information recording surface of the optical disk, both surfaces of which are aspheric surfaces. Both of the aberration correction element L1 and the light-converging element L2 are plastic lenses. In the periphery of respective optical function sections, flange sections FL1, FL2 which are integrally molded with the optical function section, are formed to be integrated with each other by engaging mutual portions of one portion of such flange sections FL1, Fl2.

Figures 3A, 3B, 3C:
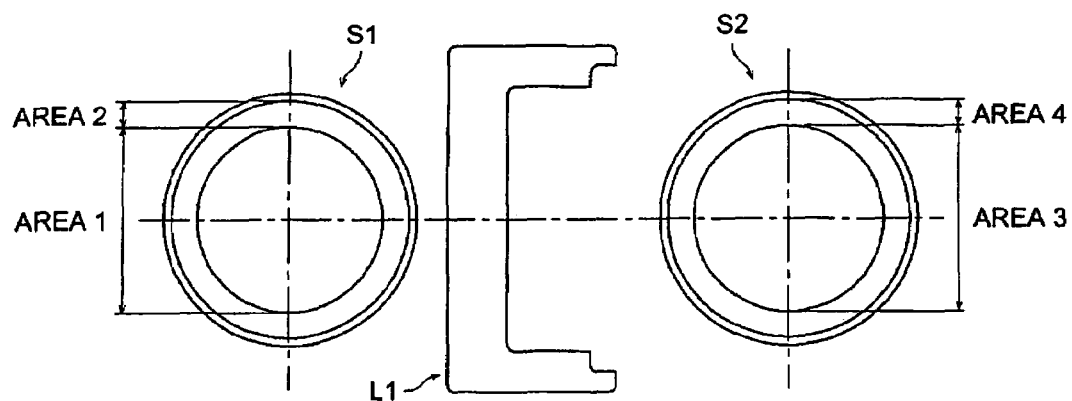
FIGS. 3(a) to (c) are views showing a structure of an aberration correction element.

The optical function surface S1 on the light source side of the aberration correction element L1 is, as shown in FIG. 3(a), divided into the first area AREA 1 corresponding to an area up to the numerical aperture 0.67 of DVD, and the second area AREA 2 corresponding to an area from the numerical aperture 0.67 of DVD to the numerical aperture 0.85 of the high density optical disk HD. The first area AREA 1 forms a step type diffractive structure HOE in which a plurality of ring-shaped zones in which step structures are formed, are arranged around the optical axis thereon.

In the step type diffractive structure HOE formed in the first area AREA 1, the depth d0 per one step of the step structure formed in each ring-shaped zone is set to a value calculated by $d0=2\times\lambda 1/(n1-1)$ (μm), and the number N of divisions of each ring-shaped zone is set to 5. Where, $\lambda 1$ is the wavelength of laser light flux projected from the blue violet semiconductor laser, and is expressed in micron unit (herein, $\lambda 1=0.408$ μm), n1 is an refractive index to the wavelength $\lambda 1$ of the aberration correction element L1 (herein, n1=1.5242).

When the laser light flux of wavelength $\lambda 1$ is incident on this step type diffractive structure HOE, the optical path difference of $2\times\lambda 1$ (μm) is generated between adjoining steps. Because, to the laser light flux of wavelength $\lambda 1$, the phase difference is not practically given, the light flux transmits as it is without being diffracted. Hereupon, in the following description, the light flux which transmits as it is without the phase difference being practically given by the step type diffractive structure, is referred to 0-order diffraction light.

On the one hand, when the laser light flux of wavelength $\lambda 2$ (herein, $\lambda 2=0.658$ μm) projected from the red semiconductor laser is incident on this step type diffractive structure HOE, the optical path difference of $d0\times(n2-1)-\lambda 2=0.13$ μm is generated between adjoining steps. Because, in one of ring-shaped zone divided into 5, the optical path difference of $0.13=5\times0.65$ μm, that is, the optical path difference for one wavelength of the wavelength $\lambda 2$ is generated, the wave-fronts transmitted the adjoining ring-shaped zones are superimposed on each other, respectively being shifted by one wavelength. That is, the light flux of wavelength $\lambda 2$ becomes a diffraction light diffracted in the one-order direction by this step type diffractive structure HOE. Hereupon, n2 is a refractive index to the wavelength $\lambda 2$ of the aberration correction element L2 (herein, n2=1.5064). The diffraction efficiency of the one-order diffraction light of laser light flux of the wavelength $\lambda 2$ at this time, is 87.5%, and is a sufficient light amount for the recording/reproducing of the information on DVD. In the objective optical system OBJ, the spherical aberration due to the difference of the thickness of protective layer between the high density optical disk HD and DVD is corrected by the action of the step type diffractive structure HOE.

Further, when the laser light flux of wavelength $\lambda 3$ (herein, $\lambda 3=0.785$ λm) projected from the red semiconductor laser is incident on this step type diffractive structure, the wavelength satisfies $\lambda 3 \cong 2\times\lambda 1$. The optical path difference of $1\times\lambda 3$ (μm) is generated between adjoining steps. Also to the laser light flux of wavelength λ3, in the same manner as in the laser light flux of wavelength λ1, because the phase difference is not practically given, it is not diffracted and transmits as it is (0-order diffraction light). In the objective optical system OBJ, by difference between the magnifications to the wavelength λ1 and the wavelength λ3, the spherical aberration due to the difference of thickness of the protective layers of the high density optical disk HD and CD is corrected.

Furthermore, the optical function surface S2 on the optical disk side of the aberration correction element L1 is, as shown in FIG. 3(c), divided into the third area AREA 3 including the optical axis corresponding to an area within the numerical aperture 0.67 of DVD, and the fourth area AREA 4 corresponding to an area from the numerical aperture 0.67 of DVD to the numerical aperture 0.85 of the high density optical disk HD, and blaze type diffractive structures DOE1, DOE2 are respectively formed in the third area AREA 3 and the fourth area AREA 4. Blaze type diffractive structures DOE1, DOE2 are structures to correct the chromatic aberration of the objective optical system OBJ in the blue violet area.

Further, the optical pick-up device in each embodiment is provided with a dichroic filter DFL for limiting the numerical aperture when the recording/reproducing is conducted on CD, and this dichroic filter DFL is driven in the direction perpendicular to the optical axis through a holding member HM integrally with the objective optical system OBJ by the 2-axis actuator AC2.

As described above, the optical pick-up device PU1 of the present embodiment, the first lens MR1 in the composition lens group of the magnification adjusting optical unit arranged in the optical path between the packaged multiple light source unit and the objective optical system OBJ, is driven in the optical axis direction. It causes that the divergent angles of the light fluxes whose wavelengths are different from each other, projected from the packaged multiple light source unit are converted into angles corresponding to the magnifications of the objective optical system OBJ to respective wavelengths. Thereby, the magnifications of the objective optical system OBJ can be changed corresponding to wavelengths of light fluxes projected form the packaged multiple light source unit. It is mounted even when the objective optical system OBJ in which the magnifications to respective wavelengths are different from each other. Because the packaged multiple light source unit can be used, it is realized the cost reduction and size reduction by the reduction of the number of optical parts of the optical pick-up device PU1.

Further, the movable lens group is composed of lens groups more than two, and it decreased the movement amount of the movable lens group. Therefore, the size reduction of the optical pick-up device PU1 can be realized.

The Second Embodiment

Next, the second embodiment of the present invention will be described, however, the same structure as the above-described first embodiment is denoted by the same sign, and its description will be omitted.

Figure 4:
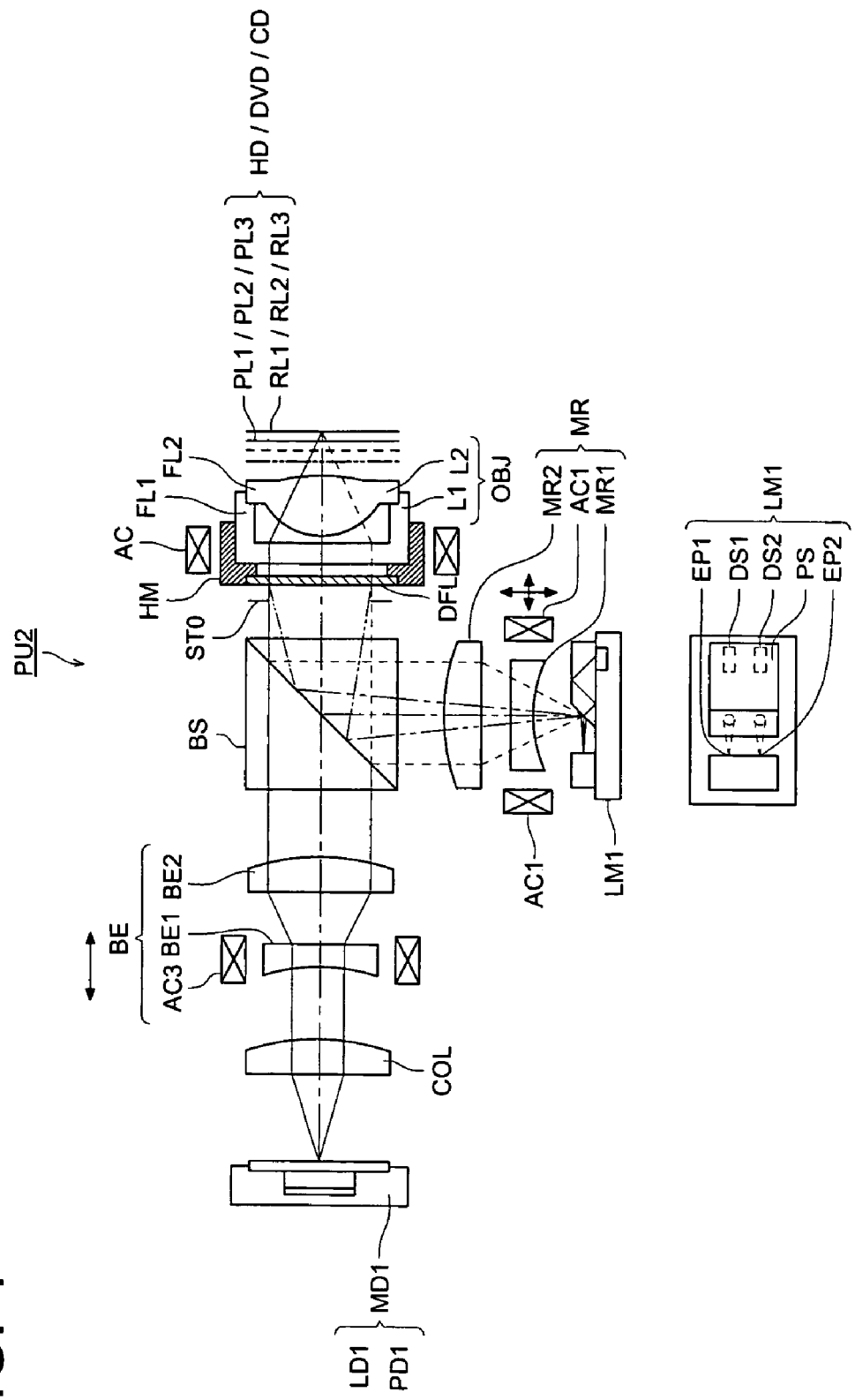
FIG. 4 is a main portion plane view showing a structure of an optical pick-up device.

As shown in FIG. 4, the optical pick-up device PU2 is structured by: a module MD1 for a high density optical disk HD-use which integrates the blue violet semiconductor laser LD1 which emits the laser light flux (the first light flux) of wavelength 408 nm when the recording/reproducing of the information is conducted on the high density optical disk, and a light detector PD1; a laser module LM1 for DVD/CD (packaged multiple light source unit) composed of the first light-emitting point EP1 which emits the laser light flux (the second light flux) of wavelength 658 nm when the recording/reproducing of the information is conducted on DVD, the second light-emitting point EP2 which emits the laser light flux (the third light flux) of wavelength 785 nm when the recording/reproducing of the information is conducted on CD, first light receiving section DS1 which light-receives the reflected light flux from the information recording surface RL2 of DVD, second light receiving section DS2 which light-receives the reflected light flux from the information recording surface RL3 of CD, and a prism PS; a magnification adjusting optical unit MR composed of a movable lens group composed of 2 lenses of a plastic lens (the first lens MR1) whose paraxial refractive power is negative, and a plastic lens (the second lens MR2) whose paraxial refractive power is positive, and the first lens drive-use actuator AC1; objective optical system OBJ composed of an aberration correction element L1, and light-converging element L2 both surfaces of which are aspheric surfaces, having a function by which the laser light flux transmitted this aberration correction element L1 is light-converged on the information recording surface RL1, RL2, RL3; 2-axis actuator AC2; polarizing beam splitter BS; collimator lens COL; beam expander optical system BE; and stop STO.

The beam expander optical system BE is composed of the first lens BE1 whose paraxial refractive power is negative, and the second lens BE2 whose paraxial refractive power is positive, and the first lens BE1 can be moved in the optical axis direction by the one axis actuator AC3.

Hereupon, the beam expander optical system BE is an element by which the spherical aberration generated at the time of focus jump between the information recording surfaces of the high density optical disk HD, the spherical aberration generated in the objective optical system OBJ due to the refractive index change/refractive index distribution following the environmental temperature change, and the spherical aberration generated in the objective optical system OBJ due to the wavelength dispersion by the production error of the blue violet semiconductor laser LD1 are corrected.

In the optical pick-up device PU2, when the recording/reproducing of the information is conducted on the high density optical disk HD, as its path of ray is shown by a solid line in FIG. 4, initially, the blue violet semiconductor laser LD1 is light-emitted. After the divergent light flux projected from the blue violet semiconductor laser LD1 is converted into the parallel light flux when it transmits the collimator lens COL, its diameter is expanded when it passes the beam expander optical system BE, it passes the polarizing beam splitter BS, and becomes a spot formed on the information recording surface RL1 by the objective optical system OBJ, through the protective layer PL1 of the high density optical disk HD.

Then, the objective optical system OBJ conducts the focusing or tracking by the 2-axis actuator AC2 arranged in its periphery. The reflected light flux modulated by an information pit on the information recording surface RL1 passes again the objective optical system OBJ, polarizing beam splitter BS, beam expander optical system BE, and collimator lens COL, and is converged on the light-receiving surface of the light detector PD1. Then, by using the output signal of the light detector PD1, the information recorded in the high density optical disk HD can be read.

Further, when the recording/reproducing of the information is conducted on DVD, initially, the first lens is moved so that an interval between the first lens MR1 and the second lens MR2 is a predetermined distance, by the first lens drive-use actuator AC1.

Then, as the path of ray is shown by a dotted line in FIG. 4, the first light-emitting point EP1 is light-emitted. The divergent light flux projected from the first light-emitting point EP1, after it is reflected by the prism PS, when it passes the first lens MR1 and the second lens MR2, is converted into a divergent light flux corresponding to the magnification m2 to the wavelength λ2 of the objective optical system OBJ, reflected by the polarizing beam splitter BS, and by the objective optical system OBJ, becomes a spot formed on the information recording surface RL2 through the protective layer PL2 of DVD.

Then, the objective optical system OBJ conducts the focusing or tracking by the 2-axis actuator AC2 arranged in its periphery. The reflected light flux modulated by an information pit on the information recording surface RL2 passes again the objective optical system OBJ, polarizing beam splitter BS, and is branched by the polarizing beam splitter BS, passes the second lens MR2, first lens MR1, and after it is reflected two times in the prism PS, it is converged on the light-receiving surface of the first light-receiving section DS1. Then, by using the output signal of the first light-receiving section DS1, the information recorded in DVD can be read.

Further, when the recording/reproducing of the information is conducted on CD, initially, by the first lens drive-use actuator AC1, the first lens is moved so that an interval between the first lens MR1 and the second lens MR2 is a predetermined distance, specifically, so that it is shorter than at the time of the recording/reproducing of the information on DVD.

Then, as the path of ray is shown by a two-dotted chain line in FIG. 4, the second light-emitting point EP2 is light-emitted. The divergent light flux projected from the second light-emitting point EP2, after it is reflected by the prism PS, when it passes the first lens MR1 and the second lens MR2, is converted into the divergent light flux corresponding to the magnification m3 to the wavelength λ3 of the objective optical system OBJ, reflected by the polarizing beam splitter BS, and by the objective optical system OBJ, becomes a spot formed on the information recording surface RL3 through the protective layer PL3 of CD.

Then, the objective optical system OBJ conducts the focusing or tracking by the 2-axis actuator AC2 arranged in its periphery. The reflected light flux modulated by an information pit on the information recording surface RL3 passes again the objective optical system OBJ, polarizing beam splitter BS, and is branched by the polarizing beam splitter BS, passes the second lens MR2, first lens MR1, and after it is reflected two times in the prism PS, it is converged on the light-receiving surface of the second light-receiving section DS2. Then, by using the output signal of the second light-receiving section DS2, the information recorded in CD can be read.

The Third Embodiment

Next, the third embodiment of the present invention will be described, however, the same structure as the above-described first embodiment is denoted by the same sign, and its description will be omitted.

Figure 5:
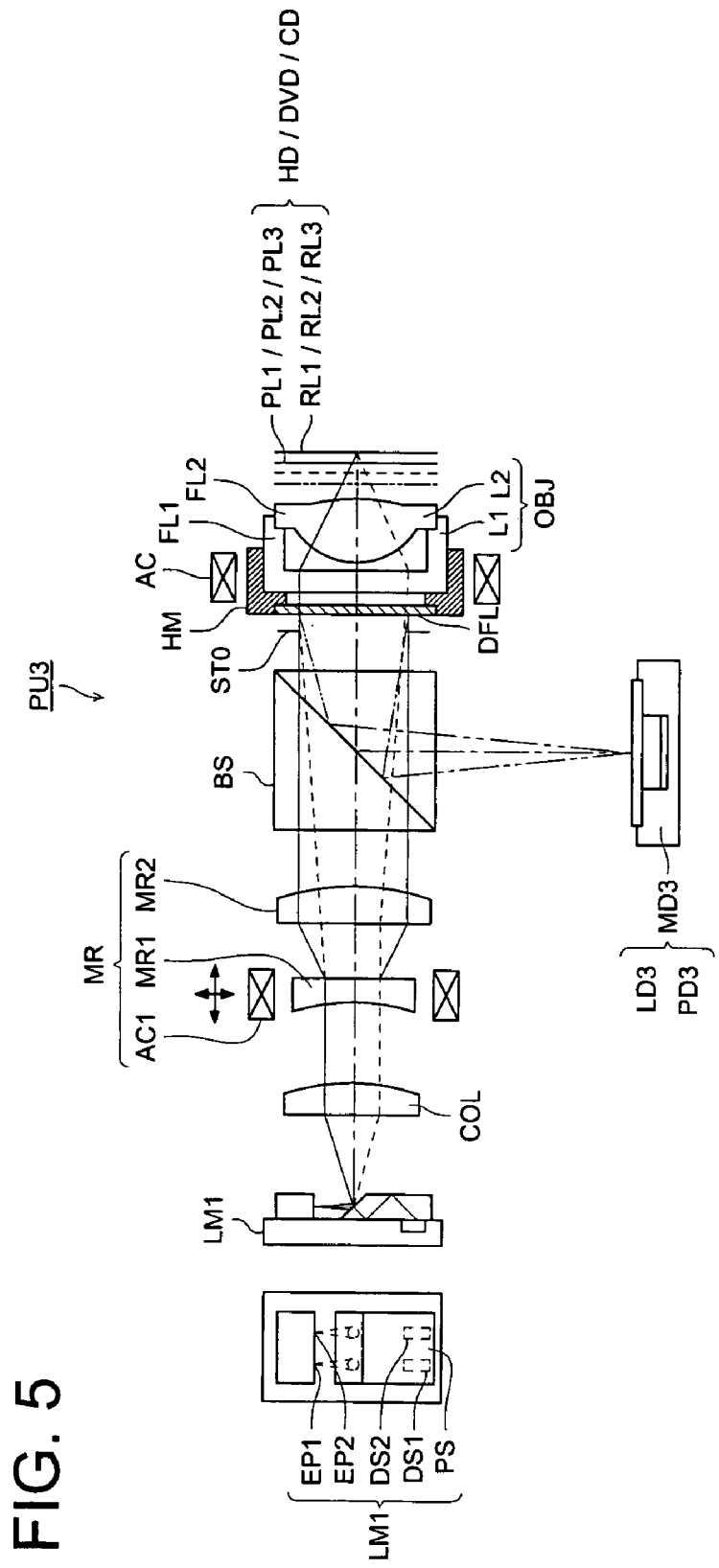
FIG. 5 is a main portion plane view showing a structure of an optical pick-up device.

As shown in FIG. 5, the optical pick-up device PU3 is structured by: a laser module LM1 for a high density optical disk/DVD (packaged multiple light source unit) composed of the first light-emitting point EP1 which emits the first light flux when the recording/reproducing of the information is conducted on the high density optical disk HD, and the second light-emitting point EP2 which emits the second light flux when the recording/reproducing of the information is conducted on DVD, the first light-receiving section DS1 which light-receives the reflected light flux from the information recording surface RL1 of the high density optical disk HD, the second light-receiving section DS2 which light-receives the reflected light flux from the information recording surface RL2 of DVD, and a prism PS; a module MD3 for CD which integrates the infrared semiconductor laser LD3 which emits the third light flux when the recording/reproducing of the information is conducted on CD, and a light detector PD3; a magnification adjusting optical unit MR composed of a movable lens group composed of 2 lenses of a plastic lens (the first lens MR1) whose paraxial refractive power is negative, and a plastic lens (the second lens MR2) whose paraxial refractive power is positive, and the first lens drive-use actuator AC1; the objective optical system OBJ composed of the aberration correction element L1 and the light-converging element L2 both surfaces of which are aspheric surfaces, having a function by which the laser light flux transmitted this aberration correction element L1 is light-converged on the information recording surfaces RL1, RL2, RL3; a 2-axis actuator AC2; a polarizing beam splitter BS; a collimator lens COL; and stop STO.

In the optical pick-up device PU1, when the recording/reproducing of the information is conducted on the high density optical disk HD, initially, by the first lens drive-use actuator AC1, the first lens is moved so that an interval between the first lens MR1 and the second lens MR2 is a predetermined distance.

Then, as the path of ray is shown by a solid line in FIG. 5, initially, the first light-emitting point EP1 is light-emitted. The divergent light flux projected from the first light-emitting point EP1 is reflected by the prism PS, and when it passes the collimator lens, after it is converted into the parallel light flux, its diameter is enlarged by the first lens and the second lens, it passes the polarizing beam splitter BS, and becomes a spot formed on the information recording surface RL1 through the protective layer PL1 of the high density optical disk HD by the objective optical system OBJ.

Then, the objective optical system OBJ conducts the focusing or tracking by the 2-axis actuator AC2 arranged in its periphery. The reflected light flux modulated by an information pit on the information recording surface RL1 passes again the objective optical system OBJ, polarizing beam splitter BS, second lens, first lens, collimator lens COL, and after it is reflected two times in the prism PS, it is converged on the light-receiving surface of the first light-receiving section DS1. Then, by using the output signal of the first light-receiving section DS1, the information recorded in the high density optical disk HD can be read.

Further, when the recording/reproducing of the information is conducted on DVD, initially, by the first lens drive-use actuator AC1, the first lens is moved so that an interval between the first lens MR1 and the second lens MR2 is a predetermined distance, specifically, so that it is shorter than at the time of the recording/reproducing of the information on the high density optical disk HD.

Then, as the path of ray is shown by a dotted line in FIG. 5, the second light-emitting point EP2 is light-emitted. The divergent light flux projected from the second light-emitting point EP2 is reflected by the prism PS, and when it passes the collimator lens COL, after it is converted into the parallel light flux, it is converted into the divergent light flux corresponding to the magnification m2 to the wavelength λ2 of the objective optical system OBJ by the first lens MR1 and second lens MR2, it passes the polarizing beam splitter BS, and becomes a spot formed on the information recording surface RL2 through the protective layer PL2 of DVD by the objective optical system OBJ.

Then, the objective optical system OBJ conducts the focusing or tracking by the 2-axis actuator AC2 arranged in its periphery. The reflected light flux modulated by an information pit on the information recording surface RL2 passes again the objective optical system OBJ, polarizing beam splitter BS, second lens MR2, first lens MR1, collimator lens COL, and after it is reflected two times in the prism PS, it is converged on the light-receiving surface of the second light-receiving section DS2. Then, by using the output signal of the second light-receiving section DS2, the information recorded in DVD can be read.

Further, when the recording/reproducing of the information is conducted on CD, as the path of ray is shown by a two-dotted chain line in FIG. 5, initially, the infrared semiconductor laser LD3 is light-emitted. The divergent light flux projected from the infrared semiconductor laser LD3 is reflected by the polarizing beam splitter BS, and becomes a spot formed on the information recording surface RL3 through the protective layer PL3 of CD by the objective optical system OBJ.

Then, the objective optical system OBJ conducts the focusing or tracking by the 2-axis actuator AC2 arranged in its periphery. The reflected light flux modulated by an information pit on the information recording surface RL3 passes again the objective optical system OBJ, and is branched by the polarizing beam splitter BS, it is converged on the light-receiving surface of the light detector PD3. Then, by using the output signal of the light detector PD3, the information recorded in CD can be read.

The Fourth Embodiment

Next, the fourth embodiment of the present invention will be described, however, the same structure as the above-described first embodiment is denoted by the same sign, and its description will be omitted.

Figure 6:
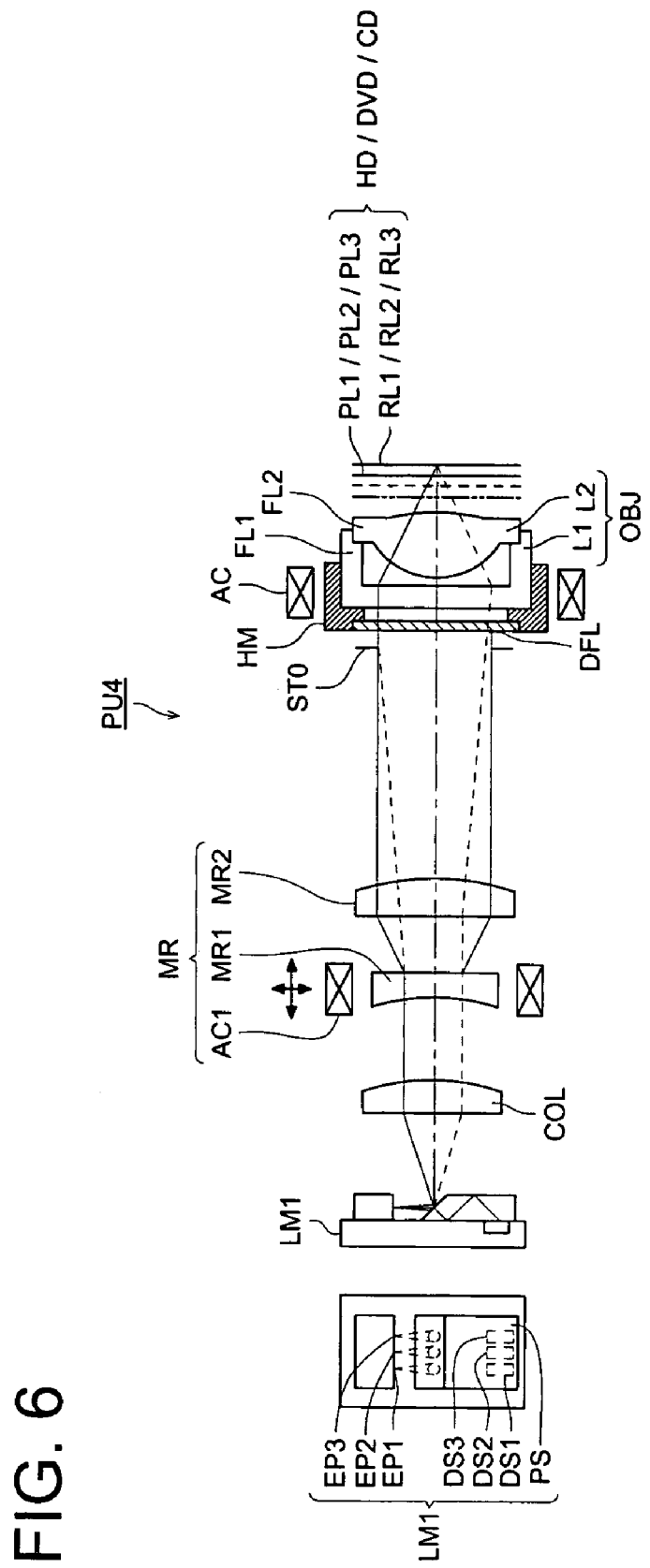
FIG. 6 is a main portion plane view showing a structure of an optical pick-up device.

As shown in FIG. 6, the optical pick-up device PU4 is structured by: a laser module LM1 for a high density optical disk/DVD/CD (packaged multiple light source unit) composed of the first light-emitting point EP1 which emits the first light flux when the recording/reproducing of the information is conducted on the high density optical disk HD, and the second light-emitting point EP2 which emits the second light flux when the recording/reproducing of the information is conducted on DVD, the third light-emitting point EP3 which emits the third light flux when the recording/reproducing of the information is conducted on CD, the first light-receiving section DS1 which light-receives the reflected light flux from the information recording surface RL1 of the high density optical disk HD, the second light-receiving section DS2 which light-receives the reflected light flux from the information recording surface RL2 of DVD, the third light-receiving section DS3 which light-receives the reflected light flux from the information recording surface RL3 of CD, and a prism PS; a magnification adjusting optical unit MR composed of an objective optical system OBJ composed of a movable lens group composed of 2 lenses of a plastic lens (the first lens MR1) whose paraxial refractive power is negative, and a plastic lens (the second lens MR2) whose paraxial refractive power is positive, and the first lens drive-use actuator AC1; an objective optical system OBJ composed of an aberration correction element L1 and a light converging element L2 both surfaces of which are aspheric surfaces, having a function by which the laser light fluxes transmitted this aberration correction element L1 are light-converged on the information recording surfaces RL1, RL2, RL3; a 2-axis actuator AC2; a polarizing beam splitter BS; a collimator lens COL; and a stop STO.

In the optical pick-up device PU1, when the recording/reproducing of the information is conducted on the high density optical disk HD, initially, the first lens MR1 is moved so that an interval between the first lens MR1 and the second lens MR2 is a predetermined distance by the first lens drive-use actuator AC1.

Then, as its path of ray is shown by a solid line in FIG. 6, initially, the first light-emitting point EP1 is light-emitted. The divergent light flux projected from the first light-emitting point EP1 is reflected by the prism PS and when it passes the collimator lens COL, after it is converted into the parallel light flux, its diameter is enlarged by the first lens MR1 and the second lens MR2, and becomes a spot formed on the information recording surface RL1 through the protective layer PL1 of the high density optical disk HD by the objective optical system OBJ.

Then, the objective optical system OBJ conducts the focusing or tracking by the 2-axis actuator AC2 arranged in its periphery. The reflected light flux modulated by an information pit on the information recording surface RL1 passes again the objective optical system OBJ, second lens MR2, first lens MR1, collimator lens COL, and after it is reflected two times in the prism PS, it is converged on the light-receiving surface of the first light-receiving section DS1. Then, by using the output signal of the first light-receiving section DS1, the information recorded in the high density optical disk HD can be read.

Further, when the recording/reproducing of the information is conducted on DVD, initially, the first lens is moved so that an interval between the first lens and the second lens is a predetermined distance, specifically, so that it is longer than at the time of the recording/reproducing on the high density optical disk HD.

Then, as the path of ray is shown by a two-dotted chain line in FIG. 6, the second light-emitting point EP2 is light-emitted. The divergent light flux projected from the second light emitting point EP2 is reflected by the prism PS, when it transmits the collimator lens COL, after it is converted into the parallel light flux, its diameter is enlarged by the first lens MR1 and the second lens MR2, and it becomes a spot formed on the information recording surface RL2 through the protective layer PL2 of DVD by the objective optical system OBJ.

Then, the objective optical system OBJ conducts the focusing or tracking by the 2-axis actuator AC2 arranged in its periphery. The reflected light flux modulated by an information pit on the information recording surface RL2 passes again the objective optical system OBJ, second lens MR2, first lens MR1, collimator lens COL, and after it is reflected two times in the prism PS, it is converged on the light-receiving surface of the second light-receiving section DS2. Then, by using the output signal of the second light-receiving section DS2, the information recorded in DVD can be read.

Further, when the recording/reproducing of the information is conducted on CD, initially, by the first lens drive-use actuator AC1, the first lens MR1 is moved so that an interval between the first lens MR1 and the second lens MR2 is a predetermined distance, specifically, so that it is shorter than at the time of the recording/reproducing on the high density optical disk HD.

Then, as its path of ray is shown by a dotted line in FIG. 6, the third light-emitting point EP3 is light-emitted. The divergent light flux projected from the third light-emitting point EP3 is reflected by the prism PS and when it passes the collimator lens COL, after it is converted into the parallel light flux, it is converted into the divergent light flux corresponding to the magnification m3 to the wavelength λ3 of the objective optical system OBJ by the first lens MR1 and the second lens MR2, and becomes a spot formed on the information recording surface RL3 through the protective layer PL3 of CD by the objective optical system OBJ.

Then, the objective optical system OBJ conducts the focusing or tracking by the 2-axis actuator AC arranged in its periphery. The reflected light flux modulated by an information pit on the information recording surface RL3 passes again the objective optical system OBJ, second lens MR2, first lens MR1, collimator lens COL, and after it is reflected two times in the prism PS, it is converged on the light-receiving surface of the third light-receiving section DS3. Then, by using the output signal of the third light-receiving section DS3, the information recorded in CD can be read.

Hereupon, although the drawing is omitted, when the optical pick-up device shown in the first-fourth embodiment, rotation drive device by which the optical disk is rotatably held, and a control device for controlling the drive of these kinds of devices are mounted, an optical information recording reproducing apparatus by which at least one of the recording of the optical information on the optical disk and the reproducing of the information recorded in the optical disk, can be conducted, can be obtained.

Next, a preferable optical system as the optical pick-up optical system mounted in the above-described optical pick-up devices PU1-PU4 will be described listing the specific numeral values.

The aspheric surface of the optical surfaces on which the superposition type diffractive structure and diffractive structure in each example are formed, is, when the deformation amount from the plane tangential to an apex of its surface is X (mm), height in the direction perpendicular to the optical axis is h (mm), radius of curvature is r (mm), expressed by a numerical expression in which the coefficients in Table 1-Table 4 shown later, are substituted into the following Equation 1. Where, κ is a conical coefficient, $A_{2i}$ is an aspheric surface coefficient.

$$X = \frac{h^2/r}{1+\sqrt{1-(1+\kappa)(h/r)^2}} + \sum_{i=2} A_{2i}h^{2i} \quad \text{(Eq-1)}$$

In Table 1-Table 4, NA is a numerical aperture, λ (nm) is a design wavelength, f(mm) is a focal distance, m is a magnification of all system of the objective lens, t(mm) is a protective substrate thickness, r(mm) is a radius of curvature, Nλ is a refractive index at 25° C. to the design wavelength, and vd shows Abbe's number in d-line. Further, in the aspheric surface, when a deformation amount from the plane tangent to the apex of the surface is X (mm), height in the direction perpendicular to the optical axis is h (mm), and radius of curvature is r (mm), it is expressed by the following Eq-1. Where, κ is a conical coefficient, and $A_{2i}$ is an aspheric surface coefficient.

Further, the superposition type diffractive structure and diffractive structure in each example are expressed by an optical path difference added to a transmission wave front by these structures. Such an optical path difference is expressed by an optical path difference function φb (mm) defined by the following Eq-2 when λ is a wavelength of an incident light flux, λB is a production wavelength, height in the direction perpendicular to the optical axis is h (mm), B2j is an optical path difference function coefficient, and n is a diffraction-order.

$$\phi b = \lambda/\lambda_B \times n \times \sum_{j=0} B_{2j}h^{2j} \quad \text{(Eq-2)}$$

EXAMPLE 1

Example 1 is an optimum optical system as the optical pick-up system mounted in the first optical pick-up device PU1, and its specific numerical data is shown in Table 1.

Table 1

PU1

Optical specification of the objective optical system

HD: NA1=0.85, f1=2.200 mm, λ1=408 nm, m1=0, t1=0.0875 mm

DVD: NA2=0.67, f2=2.309 mm, λ2=658 nm, m2=0, t2=0.6 mm

CD: NA3=0.51, f3=2.281 mm, λ3=785 nm, m3=−1/8.000, t3=1.2 mm

Paraxial Data

| Surface No. | r (mm) | d1 (mm) | d2 (mm) | d3 (mm) | Nλ1 | Nλ2 | Nλ3 | vd | note |
|---|---|---|---|---|---|---|---|---|---|
| OBJ | — | ∞ | 3.829 | 6.492 | | | | | *1 |
| 1 | −0.175 | — | 1.354 | 1.354 | 1.52424 | 1.50642 | 1.50324 | 56.5 | *2 |
| 2 | ∞ | — | 2.913 | 0.250 | | | | | |
| 3 | ∞ | — | 1.515 | 1.515 | 1.52424 | 1.50642 | 1.50324 | 56.5 | |
| 4 | −2.600 | — | 15.000 | 15.000 | | | | | |
| STO | | 0.050 | 0.050 | 0.050 | | | | | stop |
| 6 | *5 | 0.900 | 0.900 | 0.900 | 1.52424 | 1.50642 | 1.50324 | 56.5 | *3 |
| 7 | *5 | 0.050 | 0.050 | 0.050 | | | | | |
| 8 | 1.445 | 2.510 | 2.510 | 2.510 | 1.55965 | 1.54062 | 1.53724 | 56.3 | |
| 9 | −4.540 | 0.679 | 0.478 | 0.324 | | | | | |
| 10 | ∞ | 0.0875 | 0.600 | 1.200 | 1.62110 | 1.57975 | 1.57326 | 30.0 | *4 |
| 11 | ∞ | | | | | | | | |

(Note)
*1: light source
*2: magnification adjusting optical unit
*3: objective optical system
*4: protective layer
*5: lower Table Aspheric surface coefficient of the 1st surface

|  | The 1st surface |
| --- | --- |
| κ | −4.46585E+00 |
| A4 | −7.69189E+00 |

Aspheric surface coefficient of the 4th surface

|  | The 1st surface |
| --- | --- |
| κ | −8.82400E−03 |
| A4 | 4.88708E−03 |
| A6 | 7.66583E−04 |

Table 1 (Continued)

Data of the 6th surface and the 7th surface

| | The 6th surface | | The 7th surface | |
| --- | --- | --- | --- | --- |
| | AREA1 ($0 \leq h \leq 1.535$) | AREA2 ($1.535 \leq h$) | AREA3 ($0 \leq h \leq 1.53$) | AREA4 ($1.53 \leq h$) |
| | Paraxial radius of curvature | | | |
| r | ∞ | 231.761 | −117.433 | −167.005 |
| | Aspheric surface coefficient | | | |
| κ | 0 | 0 | 0 | 9.6672E+01 |
| A4 | 0 | −1.2634E−04 | −2.3039E−03 | 1.0847E−03 |
| A6 | 0 | −1.4443E−03 | 3.1515E−03 | −2.2698E−04 |
| A8 | 0 | 6.3328E−04 | −2.1791E−04 | 4.0064E−04 |
| A10 | 0 | −6.8934E−05 | −5.9061E−05 | −1.3815E−05 |
| | Diffraction order | | | |
| n1/n2/n3 | 0/+1/0 | — | +2/+1/+1 | +2/+1/+1 |
| | Production wavelength | | | |
| λB | 658 nm | — | 390 nm | 408 nm |
| | Optical path difference function coefficient | | | |
| B2 | 4.7000E−03 | 0 | −5.3000E−03 | −5.2595E−03 |
| B4 | −5.5308E−04 | 0 | 5.6232E−04 | −3.8500E−04 |
| B6 | −2.5919E−04 | 0 | −7.7644E−04 | −2.8980E−04 |
| B8 | −2.0155E−05 | 0 | 5.1093E−05 | 5.6214E−05 |
| B10 | 2.0712E−07 | 0 | 1.4877E−05 | −1.4307E−05 |

Aspheric surface coefficient of the 8th and the 9th surface surface

|  | The 8th surface | The 9th surface |
| --- | --- | --- |
| κ | −6.6105E−01 | −1.5745E+02 |
| A4 | 1.1439E−02 | 1.0519E−01 |
| A6 | 2.5153E−03 | −1.1661E−01 |
| A8 | 8.3248E−06 | 1.0617E−01 |
| A10 | 2.9389E−04 | −7.0962E−02 |
| A12 | 6.6343E−05 | 2.7343E−02 |
| A14 | −4.2105E−05 | −4.3966E−03 |
| A16 | −3.6643E−06 | |
| A18 | 7.9754E−06 | |
| A20 | −1.2239E−06 | |

In the present example, a magnification adjusting optical unit composed of 2 lenses of the plastic lens whose paraxial refractive power is negative, and the plastic lens whose paraxial refractive power is positive, is arranged in the optical path between a packaged multiple light source unit in which the light-emitting point projecting the laser light flux of wavelength $\lambda 2$ and the light-emitting point projecting the laser light flux of wavelength $\lambda 3$ are housed in a casing, and the objective optical system.

In the present example, at the time of the recording/reproducing on DVD, the plastic lens whose refractive power is negative is moved by the actuator so that an interval between the plastic lens whose refractive power is negative, and the plastic lens whose refractive power is positive, by which the magnification adjusting optical unit is composed, is 2.913 mm. Thereby, the divergent light flux of wavelength $\lambda 2$ projected from the packaged multiple light source unit is converted into the parallel light flux, and incident on the objective optical system.

Further, at the time of the recording/reproducing on CD, the plastic lens whose refractive power is negative is moved by the actuator so that an interval between the plastic lens whose refractive power is negative, and the plastic lens whose refractive power is positive, by which the magnification adjusting optical unit is composed, is 0.250 nm. Thereby, the divergent light flux of wavelength $\lambda 3$ projected from the packaged multiple light source unit is converted into the divergent light flux corresponding to the magnification m3 ($=-1/8.000$) to the wavelength $\lambda 3$ of the objective optical system, and incident on the objective optical system.

EXAMPLE 2

Example 2 is an optimum optical system as the optical pick-up optical system mounted in the second optical pick-up device PU2, and its specific numerical data is shown in table 2.

Table 2

PU2
Optical specification of the objective optical system
HD: NA1=0.85, f1=2.200 mm, λ1=408 nm, m1=0, t1=0.0875 mm
DVD: NA2=0.67, f2=2.283 mm, λ2=658 nm, m2=−1/21.413, t2=0.6 mm
CD: NA3=0.51, f3=2.281 mm, λ3=785 nm, m3=−1/8.000, t3=1.2 mm Paraxial Data

| Surface No. | r (mm) | d1 (mm) | d2 (mm) | d3 (mm) | Nλ1 | Nλ2 | Nλ3 | νd | note |
|---|---|---|---|---|---|---|---|---|---|
| OBJ | — | ∞ | 4.000 | 5.977 | | | | | *1 |
| 1 | −0.152 | — | 1.070 | 1.070 | 1.52424 | 1.50642 | 1.50324 | 56.5 | *2 |
| 2 | ∞ | — | 2.727 | 0.750 | | | | | |
| 3 | ∞ | — | 1.149 | 1.149 | 1.52424 | 1.50642 | 1.50324 | 56.5 | |
| 4 | −2.616 | — | 15.000 | 15.000 | | | | | |
| STO | | 0.050 | 0.050 | 0.050 | | | | | stop |
| 6 | *5 | 0.900 | 0.900 | 0.900 | 1.52424 | 1.50642 | 1.50324 | 56.5 | *3 |
| 7 | *5 | 0.050 | 0.050 | 0.050 | | | | | |
| 8 | 1.445 | 2.510 | 2.510 | 2.510 | 1.55965 | 1.54062 | 1.53724 | 56.3 | |
| 9 | −4.540 | 0.679 | 0.537 | 0.323 | | | | | |
| 10 | ∞ | 0.0875 | 0.600 | 1.200 | 1.62110 | 1.57975 | 1.57326 | 30.0 | *4 |
| 11 | ∞ | | | | | | | | |

(Note)
*1: light source
*2: magnification adjusting optical unit
*3: objective optical system
*4: protective layer
*5: lower Table Aspheric surface coefficient of the 1st surface

| | The 1st surface |
|---|---|
| κ | −5.99736E+00 |
| A4 | −1.15213E+00 |

Aspheric surface coefficient of the 4th surface

| | The 4th surface |
|---|---|
| κ | −1.114456E−01 |
| A4 | 4.52058E−03 |
| A6 | 2.77091E−03 |

Table 2 (Continued)

Data of the 6th surface and the 7th surface

| | The 6th surface | | The 7th surface | |
|---|---|---|---|---|
| | AREA1 (0 ≤ h ≤ 1.535) | AREA2 (1.535 ≤ h) | AREA3 (0 ≤ h ≤ 1.535) | AREA4 (1.535 ≤ h) |
| | Paraxial radius of curvature | | | |
| r | ∞ | 208.039 | −117.541 | −298.235 |
| | Aspheric surface coefficient | | | |
| κ | 0 | 0 | 0 | 9.6672E+01 |
| A4 | 0 | −1.2634E−04 | 8.4974E−04 | 9.7807E−04 |
| A6 | 0 | −1.4443E−03 | 1.9705E−03 | −3.0784E−04 |
| A8 | 0 | 6.3328E−04 | −5.3893E−04 | 3.5607E−04 |
| A10 | 0 | −6.8934E−05 | 3.8508E−05 | −1.7735E−05 |

-continued

| | The 6th surface | | The 7th surface | |
|---|---|---|---|---|
| | AREA1 $(0 \leq h \leq 1.535)$ | AREA2 $(1.535 \leq h)$ | AREA3 $(0 \leq h \leq 1.535)$ | AREA4 $(1.535 \leq h)$ |
| | Diffraction order | | | |
| n1/n2/n3 | 0/+1/0 | — | +2/+1/+1 | +2/+1/+1 |
| | Production wavelength | | | |
| λB | 658 nm | — | 390 nm | 408 nm |
| | Optical path difference function coefficient | | | |
| B2 | 0 | 0 | −5.3000E−03 | −5.5393E−03 |
| B4 | −7.6384E−04 | 0 | −2.1003E−04 | −3.6735E−04 |
| B6 | 8.0040E−05 | 0 | −4.9344E−04 | −2.5117E−04 |
| B8 | −3.1371E−05 | 0 | 1.3567E−04 | 6.1137E−05 |
| B10 | −5.3665E−06 | 0 | −1.0001E−05 | −1.2440E−05 |

Aspheric surface coefficient of the 8th surface and the 9th surface

| | The 8th surface | The 9th surface |
|---|---|---|
| κ | −6.6105E−01 | −1.5745E+02 |
| A4 | 1.1439E−02 | 1.0519E−01 |
| A6 | 2.5153E−03 | −1.1661E−01 |
| A8 | 8.3248E−06 | 1.0617E−01 |
| A10 | 2.9389E−04 | −7.0962E−02 |
| A12 | 6.6343E−05 | 2.7343E−02 |
| A14 | −4.2105E−05 | −4.3966E−03 |
| A16 | −3.6643E−06 | |
| A18 | 7.9754E−06 | |
| A20 | −1.2239E−06 | |

In the present example, a magnification adjusting optical unit composed of 2 lenses of the plastic lens whose paraxial refractive power is negative, and the plastic lens whose paraxial refractive power is positive, is arranged in the optical path between a packaged multiple light source unit in which the light-emitting point projecting the laser light flux of wavelength λ2 and the light-emitting point projecting the laser light flux of wavelength λ3 are housed in a casing, and the objective optical system.

In the present example, at the recording/reproducing on DVD, the plastic lens whose refractive power is negative, is moved by the actuator so that an interval between the plastic lens whose refractive power is negative, and the plastic lens whose refractive power is positive, which compose the magnification adjusting optical unit, is 2.727 mm. Thereby, the divergent light flux of wavelength λ2 projected from the packaged multiple light source unit is converted into the divergent light flux corresponding to the magnification m2 (=−1/21.413) to the wavelength λ2 of the objective optical system, and it is incident on the objective optical system.

Further, at the recording/reproducing on CD, the plastic lens whose refractive power is negative, is moved by the actuator so that an interval between the plastic lens whose refractive power is negative, and the plastic lens whose refractive power is positive, which compose the magnification adjusting optical unit, is 0.0750 mm. Thereby, the divergent light flux of wavelength λ3 projected from the packaged multiple light source unit is converted into the divergent light flux corresponding to the magnification m3 (=−1/8.000) to the wavelength λ3 of the objective optical system, and it is incident on the objective optical system.

EXAMPLE 3

Example 3 is an optimum optical system as the optical pick-up optical system mounted in the third optical pick-up device PU3, and its specific numerical data is shown in Table 3.

Table 3

PU3
Optical specification of the objective optical system
HD: NA1=0.85, f1=2.200 mm, λ1=408 nm, m1=0, t1=0.0875 mm
DVD: NA2=0.67, f2=2.283 mm, λ2=658 nm, m2=−1/21.413, t2=0.6 mm
CD: NA3=0.51, f3=2.281 mm, λ3=785 nm, m3=−1/8.000, t3=1.2 mm Paraxial Data

| Surface No. | r (mm) | d1 (mm) | d2 (mm) | d3 (mm) | Nλ1 | Nλ2 | Nλ3 | vd | note |
|---|---|---|---|---|---|---|---|---|---|
| OBJ | — | ∞ | ∞ | 19.387 | | | | | *1 |
| 1 | −0.878 | 0.800 | 0.800 | — | 1.52424 | 1.50642 | 1.50324 | 56.5 | *2 |
| 2 | ∞ | 2.000 | 1.530 | — | | | | | |
| 3 | ∞ | 1.000 | 1.000 | — | 1.52424 | 1.50642 | 1.50324 | 56.5 | |
| 4 | −2.545 | 10.000 | 10.000 | — | | | | | |
| STO | | 0.050 | 0.050 | 0.050 | | | | | stop |
| 6 | *5 | 0.900 | 0.900 | 0.900 | 1.52424 | 1.50642 | 1.50324 | 56.5 | *3 |
| 7 | *5 | 0.050 | 0.050 | 0.050 | | | | | |

-continued

| Surface No. | r (mm) | d1 (mm) | d2 (mm) | d3 (mm) | Nλ1 | Nλ2 | Nλ3 | νd | note |
|---|---|---|---|---|---|---|---|---|---|
| 8 | 1.445 | 2.510 | 2.510 | 2.510 | 1.55965 | 1.54062 | 1.53724 | 56.3 | |
| 9 | −4.540 | 0.679 | 0.536 | 0.330 | | | | | |
| 10 | ∞ | 0.0875 | 0.600 | 1.200 | 1.62110 | 1.57975 | 1.57326 | 30.0 | *4 |
| 11 | ∞ | | | | | | | | |

(Note)
*1: light source
*2: magnification adjusting optical unit
*3: objective optical system
*4: protective layer
*5: lower Table Aspheric surface coefficient of the 1st surface

| | The 1st surface |
|---|---|
| κ | −1.01950E+00 |
| A4 | −2.87937E−02 |

Aspheric surface coefficient of the 4th surface

| | The 4th surface |
|---|---|
| κ | −1.28717E+00 |
| A4 | 4.85669E−03 |

Aspheric surface coefficient of the 8th surface and the 9th surface

| | The 8th surface | The 9th surface |
|---|---|---|
| κ | −6.6105E−01 | −1.5745E+02 |
| A4 | 1.1439E−02 | 1.0519E−01 |
| A6 | 2.5153E−03 | −1.1661E−01 |
| A8 | 8.3248E−06 | 1.0617E−01 |
| A10 | 2.9389E−04 | −7.0962E−02 |
| A12 | 6.6343E−05 | 2.7343E−02 |
| A14 | −4.2105E−05 | −4.3966E−03 |
| A16 | −3.6643E−06 | |
| A18 | 7.9754E−06 | |
| A20 | −1.2239E−06 | |

In the present example, a magnification adjusting optical unit composed of 2 lenses of the plastic lens whose paraxial refractive power is negative, and the plastic lens whose paraxial refractive power is positive, is arranged in the Table 3 (Continued)

Data of the 6th surface and the 7th surface

| | The 6th surface | | The 7th surface | |
|---|---|---|---|---|
| | AREA1 (0 ≤ h ≤ 1.535) | AREA2 (1.535 ≤ h) | AREA3 (0 ≤ h ≤ 1.535) | AREA4 (1.535 ≤ h) |
| | Paraxial radius of curvature | | | |
| r | ∞ | 208.039 | −117.541 | −298.235 |
| | Aspheric surface coefficient | | | |
| κ | 0 | 0 | 0 | 9.6672E+01 |
| A4 | 0 | −1.2634E−04 | 8.4974E−04 | 9.7807E−04 |
| A6 | 0 | −1.4443E−03 | 1.9705E−03 | −3.0784E−04 |
| A8 | 0 | 6.3328E−04 | −5.3893E−04 | 3.5607E−04 |
| A10 | 0 | −6.8934E−05 | 3.8508E−05 | −1.7735E−05 |
| | Diffraction order | | | |
| n1/n2/n3 | 0/+1/0 | — | +2/+1/+1 | +2/+1/+1 |
| | Production wavelength | | | |
| λB | 658 nm | — | 390 nm | 408 nm |
| | Optical path difference function coefficient | | | |
| B2 | 0 | 0 | −5.3000E−03 | −5.5393E−03 |
| B4 | −7.6384E−04 | 0 | −2.1003E−04 | −3.6735E−04 |
| B6 | 8.0040E−05 | 0 | −4.9344E−04 | −2.5117E−04 |
| B8 | −3.1371E−05 | 0 | 1.3567E−04 | 6.1137E−05 |
| B10 | −5.3665E−06 | 0 | −1.0001E−05 | −1.2440E−05 | optical path between the collimator lens by which the laser light flux projected from a packaged multiple light source unit in which the light-emitting point projecting the laser light flux of wavelength λ1 and the light-emitting point projecting the laser light flux of wavelength λ2 are housed in a casing, is converted into an almost parallel light flux, and the objective optical system.

In the present example, at the recording/reproducing on HD, the plastic lens whose refractive power is negative, is moved by the actuator so that an interval between the plastic lens whose refractive power is negative, and the plastic lens whose refractive power is positive, which compose the magnification adjusting optical unit, is 2.000 mm. Thereby, in the parallel light flux of wavelength λ1 projected from the packaged multiple light source unit, and converted into the parallel light flux by the collimator lens, its light flux diameter is enlarged by the magnification adjusting optical unit, and it is incident on the objective optical system.

Further, at the recording/reproducing on DVD, the plastic lens whose refractive power is negative, is moved by the actuator so that an interval between the plastic lens whose refractive power is negative, and the plastic lens whose refractive power is positive, which compose the magnification adjusting optical unit, is 1.530 mm. Thereby, the parallel light flux of wavelength λ2 projected from the packaged multiple light source unit, and converted into the parallel light flux by the collimator lens, is converted into the divergent light flux corresponding to the magnification m2 (=−1/21.413) to the wavelength λ2 of the objective optical system by the magnification adjusting optical unit, and it is incident on the objective optical system.

EXAMPLE 4

Example 4 is an optimum optical system as the optical pick-up optical system mounted in the fourth optical pick-up device PU4, and its specific numerical data is shown in Table 4.

Table 4

PU4

Optical specification of the objective optical system

HD: NA1=0.85, f1=2.200 mm, λ1=408 nm, m1=0, t1=0.0875 mm

DVD: NA2=0.67, f2=2.309 mm, λ2=658 nm, m2=0, t2=0.6 mm

CD: NA3=0.51, f3=2.281 mm, λ3=785 nm, m3=−1/8.000, t3=1.2 mm

Paraxial Data

| Surface No. | r (mm) | d1 (mm) | d2 (mm) | d3 (mm) | Nλ1 | Nλ2 | Nλ3 | vd | note |
|---|---|---|---|---|---|---|---|---|---|
| OBJ | — | ∞ | ∞ | ∞ | | | | | *1 |
| 1 | −0.879 | 0.8000 | 0.800 | 0.800 | 1.52424 | 1.50642 | 1.50324 | 56.5 | *2 |
| 2 | ∞ | 2.000 | 2.103 | 0.320 | | | | | |
| 3 | ∞ | 1.000 | 1.000 | 1.000 | 1.52424 | 1.50642 | 1.50324 | 56.5 | |
| 4 | −2.550 | 10.000 | 10.000 | 10.000 | | | | | |
| STO | | 0.050 | 0.050 | 0.050 | | | | | stop |
| 6 | *5 | 0.900 | 0.900 | 0.900 | 1.52424 | 1.50642 | 1.50324 | 56.5 | *3 |
| 7 | *5 | 0.050 | 0.050 | 0.050 | | | | | |
| 8 | 1.445 | 2.510 | 2.510 | 2.510 | 1.55965 | 1.54062 | 1.53724 | 56.3 | |
| 9 | −4.540 | 0.680 | 0.478 | 0.334 | | | | | |
| 10 | ∞ | 0.0875 | 0.600 | 1.200 | 1.62110 | 1.57975 | 1.57326 | 30.0 | *4 |
| 11 | ∞ | | | | | | | | |

(Note)
*1: light source
*2: magnification adjusting optical unit
*3: objective optical system
*4: protective layer
*5: lower Table Aspheric surface coefficient of the 1st surface

| | The 1st surface |
|---|---|
| κ | −9.96755E−01 |
| A4 | −8.73298E−02 |

Aspheric surface coefficient of the 4th surface

| | The 4th surface |
|---|---|
| κ | −1.40789E+00 |
| A4 | −6.57897E−03 |

Table 4 (Continued)

Data of the 6th surface and the 7th surface

|  | The 6th surface | | The 7th surface | |
| --- | --- | --- | --- | --- |
|  | AREA1 ($0 \leq h \leq 1.535$) | AREA2 ($1.535 \leq h$) | AREA3 ($0 \leq h \leq 1.53$) | AREA4 ($1.53 \leq h$) |
|  | Paraxial radius of curvature | | | |
| r | ∞ | 231.761 | −117.433 | −167.005 |
|  | | Aspheric surface coefficient | | |
| κ | 0 | 0 | 0 | 9.6672E+01 |
| A4 | 0 | −1.2634E−04 | −2.3039E−03 | 1.0847E−03 |
| A6 | 0 | −1.4443E−03 | 3.1515E−03 | −2.2698E−04 |
| A8 | 0 | 6.3328E−04 | −2.1791E−04 | 4.0064E−04 |
| A10 | 0 | −6.8934E−05 | −5.9061E−05 | −1.3815E−05 |
|  | Diffraction order | | | |
| n1/n2/n3 | 0/+1/0 | — | +2/+1/+1 | +2/+1/+1 |
|  | Production wavelength | | | |
| λB | 658 nm | — | 390 nm | 408 nm |
|  | Optical path difference function coefficient | | | |
| B2 | 4.7000E−03 | 0 | −5.3000E−03 | −5.2595E−03 |
| B4 | −5.5308E−04 | 0 | 5.6232E−04 | −3.8500E−04 |
| B6 | −2.5919E−04 | 0 | −7.7644E−04 | −2.8980E−04 |
| B8 | −2.0155E−05 | 0 | 5.1093E−05 | 5.6214E−05 |
| B10 | 2.0712E−07 | 0 | 1.4877E−05 | −1.4307E−05 |

Aspheric surface coefficient of the 8th surface and the 9th surface

|  | The 8th surface | The 9th surface |
| --- | --- | --- |
| κ | −6.6105E−01 | −1.5745E+02 |
| A4 | 1.1439E−02 | 1.0519E−01 |
| A6 | 2.5153E−03 | −1.1661E−01 |
| A8 | 8.3248E−06 | 1.0617E−01 |
| A10 | 2.9389E−04 | −7.0962E−02 |
| A12 | 6.6343E−05 | 2.7343E−02 |
| A14 | −4.2105E−05 | −4.3966E−03 |
| A16 | −3.6643E−06 |  |
| A18 | 7.9754E−06 |  |
| A20 | −1.2239E−06 |  |

In the present example, a magnification adjusting optical unit composed of 2 lenses of the plastic lens whose paraxial refractive power is negative, and the plastic lens whose paraxial refractive power is positive, is arranged in the optical path between the collimator lens by which the laser light flux projected from a packaged multiple light source unit in which the light-emitting point projecting the laser light flux of wavelength λ1, the light-emitting point projecting the laser light flux of wavelength λ2, and the light-emitting point projecting the laser light flux of wavelength λ3, are housed in a casing, is converted into an almost parallel light flux, and the objective optical system.

In the present example, at the recording/reproducing on HD, the plastic lens whose refractive power is negative, is moved by the actuator so that an interval between the plastic lens whose refractive power is negative, and the plastic lens whose refractive power is positive, which compose the magnification adjusting optical unit, is 2.000 mm. Thereby, in the parallel light flux of wavelength λ1 projected from the packaged multiple light source unit, and converted into the parallel light flux by the collimator lens, its light flux diameter is enlarged by the magnification adjusting optical unit, and it is incident on the objective optical system.

Further, at the recording/reproducing on DVD, the plastic lens whose refractive power is negative, is moved by the actuator so that an interval between the plastic lens whose refractive power is negative, and the plastic lens whose refractive power is positive, which compose the magnification adjusting optical unit, is 2.103 mm. Thereby, in the parallel light flux of wavelength λ2 projected from the packaged multiple light source unit, and converted into the parallel light flux by the collimator lens, its light flux diameter is enlarged by the magnification adjusting optical unit, and it is incident on the objective optical system.

Further, at the recording/reproducing on CD, the plastic lens whose refractive power is negative, is moved by the actuator so that an interval between the plastic lens whose refractive power is negative, and the plastic lens whose refractive power is positive, which compose the magnification adjusting optical unit, is 0.320 mm. Thereby, the parallel light flux of wavelength λ3 projected from the packaged multiple light source unit, and converted into the parallel light flux by the collimator lens, is converted into the divergent light flux corresponding to magnification m3 (=−1/8.000) to the wavelength λ3 of the objective optical system by the magnification adjusting optical unit, and it is incident on the objective optical system.

Hereupon, in Example 1-4 described above, in the case where the divergent light flux is incident on the objective optical system, when the objective optical system is shifted in the direction perpendicular to the optical axis by the tracking drive, because the virtual objective point of the objective optical system becomes the off-axis objective point, and the coma is generated. When the generation amount of this coma is large, there is a problem that, at the time of the recording/reproducing on the optical disk, the good tracking characteristic is not obtained.

In Example 1-4 described above, when the plastic lens whose refractive power of the magnification adjusting optical unit is negative, is shifted in the direction perpendicular to the optical axis, the coma generated by the tracking drive of such an objective optical system can be corrected.

Figure 7:
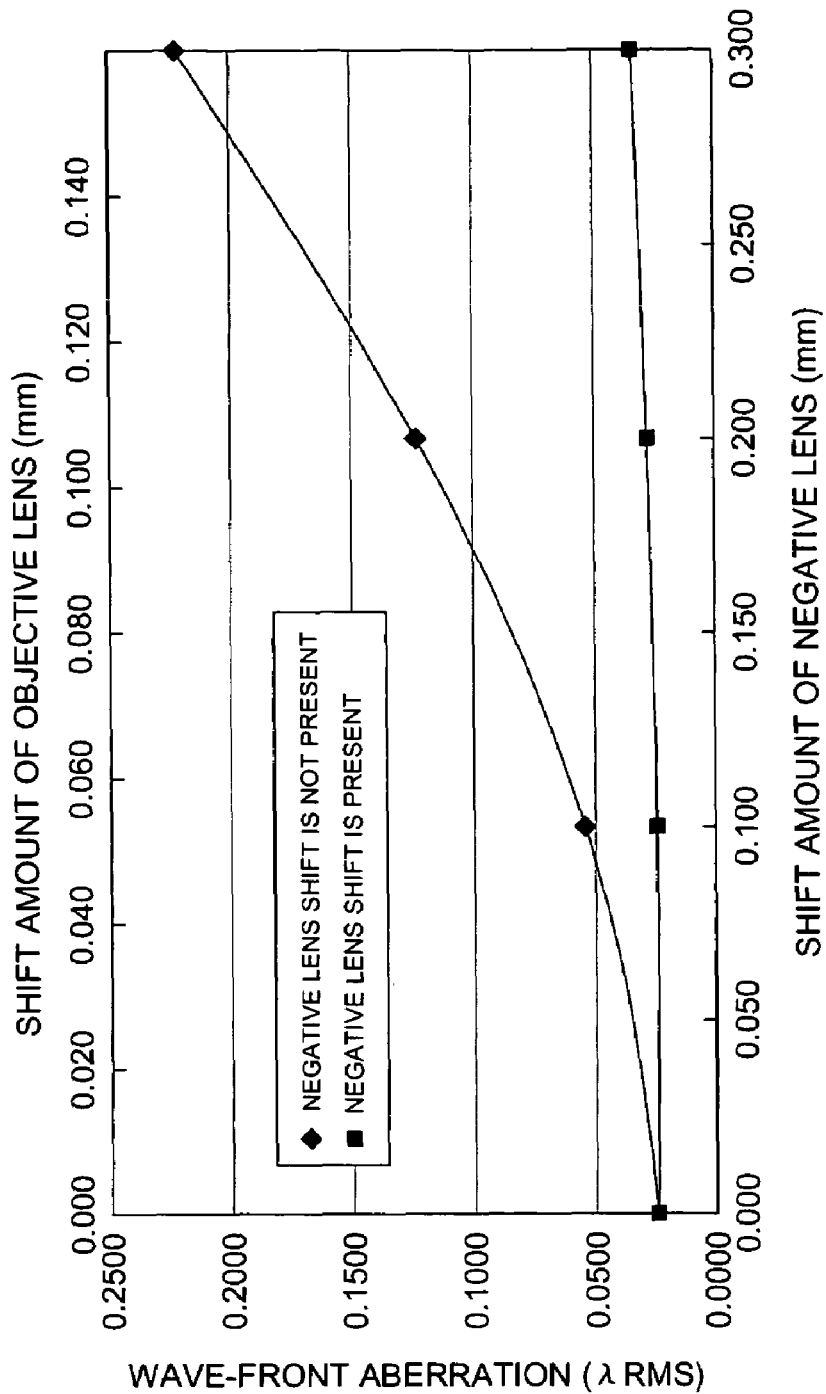
FIG. 7 is a graph showing a relationship of a shift amount of the objective lens with a wave-front aberration.
Figure 8:
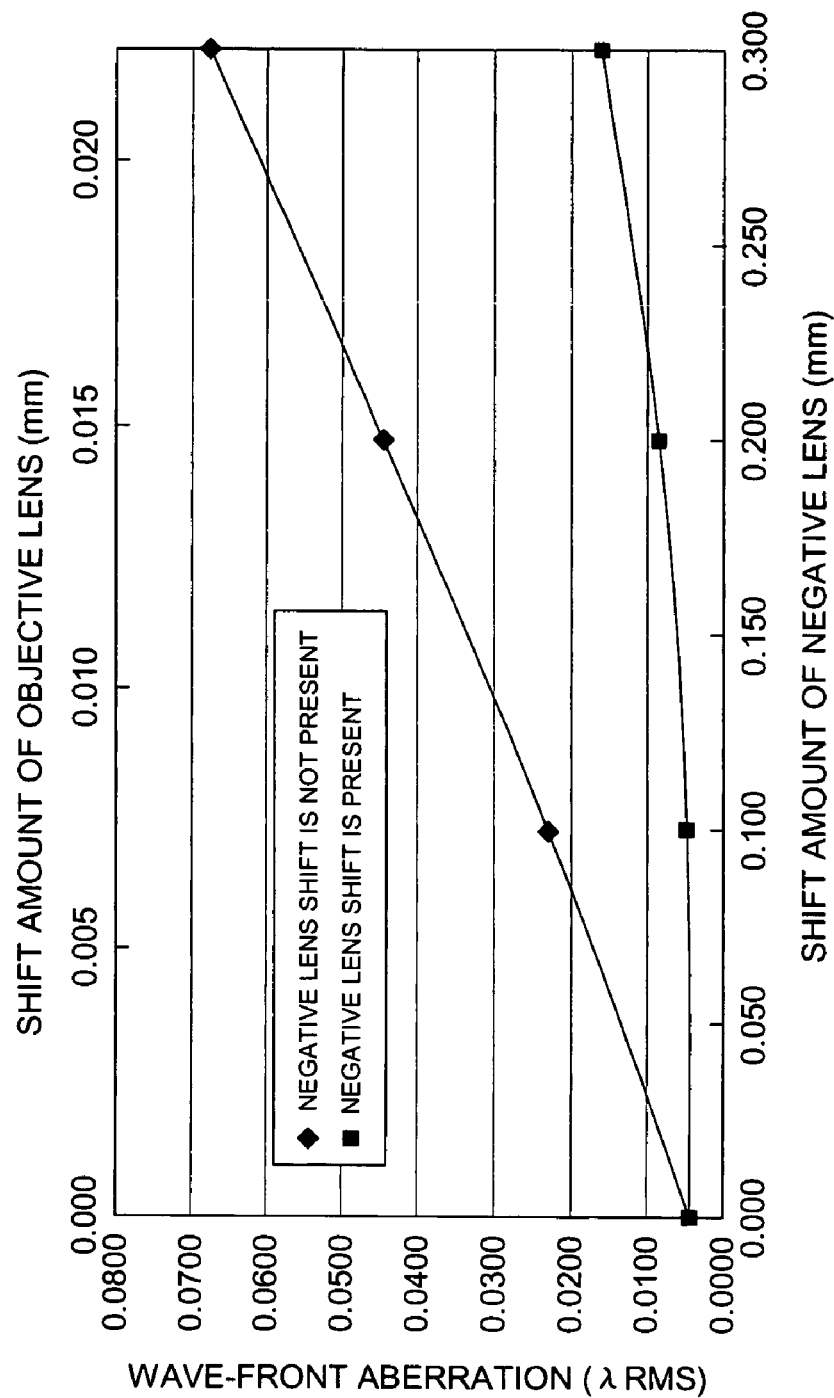
FIG. 8 is a graph showing a relationship of a shift amount of the objective lens with a wave-front aberration.

In FIG. 7, in the optical system of example 1, a result in which, at the time of the recording/reproducing on CD, the coma generated when the objective optical system is shifted in the direction perpendicular to the optical axis is corrected when the plastic lens in which the refractive power of the magnification adjusting optical unit is negative, is shifted in the direction perpendicular to the optical axis, is shown.

From these results, in the optical system of Example 1-4, it can be seen that, then the plastic lens in which the refractive power of the magnification adjusting optical unit in negative, is shifted in the direction perpendicular to the optical axis in timed relationship with the tracking drive of the objective optical system, a good tracking characteristic is obtained.

What is claimed is:

1. An optical pickup apparatus comprising:
   a first light source for emitting a first light flux with a wavelength λ1;
   a second light source for emitting a second light flux with a wavelength λ2 which is longer than the wavelength λ1;
   a third light source for emitting a third light flux with wavelength λ3 which is longer than the wavelength λ2;
   a packaged multiple light source unit for packaging emitting points of at least two of the first-third light sources in one housing;
   an objective optical system for converging light fluxes emitted by at least three kinds of light sources respectively having different wavelengths λ1, λ2 and λ3 onto information recording surfaces of at least three kinds of optical disks respectively having different information recording densities; and
   a magnification adjusting optical unit having an actuator and a movable lens group and being arranged in an optical path between the packaged multiple light source unit and the objective optical system,
   wherein the movable lens group is driven by the actuator along the optical axis so as to change a magnification of the objective optical system according to a wavelength of a light flux emitted by the packaged multiple light source unit.

2. The optical pickup apparatus of claim 1, wherein the movable lens group comprises at least two lens groups in which at least one lens group is driven by the actuator along the optical axis.

3. The optical pickup apparatus of claim 2, wherein the movable lens group comprises at least one negative lens group and at least one positive lens group.

4. The optical pickup apparatus of claim 1, wherein the packaged multiple light source unit provides the second light source and the third light source.

5. The optical pickup apparatus of claim 1, wherein the optical pickup apparatus records and/or reproduces information on optical disks using light fluxes with different wavelengths emitted by the packaged multiple light source unit separately,
wherein the optical disks have protective layers with different thicknesses for protecting the information recording surfaces,
the movable lens group is driven by the actuator along the optical axis so as to correct a spherical aberration caused by a thickness difference between the protective layers.

6. The optical pickup apparatus of claim 1, wherein the optical pickup apparatus records and/or reproduces information on optical disks using light fluxes with different wavelengths emitted by the packaged multiple light source unit separately,
an optical disk having a maximum information recording density among the optical disks comprises a multilayer structure in which optically transparent layers and information recording surfaces are laminated alternately,
the movable lens group is driven by an actuator along the optical axis so as to correct a spherical aberration which is occurred when a focus of the objective lens jumps from i-th information recording surface to j-th information recording surface, when a first information recording surfaces, a second information recording surface through n-th information recording surface are arranged in the multilayer structure comprises in this order from the packaged multiple light source unit side.

7. The optical pickup apparatus of claim 1,
wherein the objective optical system comprises at least one plastic lens and
the movable lens group is driven by the actuator along the optical axis so as to correct a spherical aberration which comes from a refractive index variation or a refractive index distribution resulting from an environmental temperature change of a plastic lens in the-objective optical system.

8. The optical pickup apparatus of claim 1,
wherein the movable lens group is driven by the actuator along the optical axis so as to correct a spherical aberration in the objective optical system which comes from a wavelength difference between light fluxes having different wavelengths respectively emitted by the packaged multiple light source unit.

9. The optical pickup apparatus of claim 1,
wherein the movable lens group is driven by the actuator along the optical axis so as to correct a spherical aberration which comes from a chromatic aberration of the objective optical system
in case that a light flux have the smallest wavelength among light fluxes with different wavelengths emitted by the packaged multiple light source unit separately and the smallest wavelength of the light flux changes in a range of ±10 nm.

10. The optical pickup apparatus of claim 1,
wherein the movable lens group is further driven to be shifted in a perpendicular direction to the optical axis and/or to be tilted against the optical axis by the actuator.

11. The optical pickup apparatus of claim 1, wherein the movable lens group is driven to be shifted in a perpendicular direction to the optical axis and/or to be tilted against the optical axis by the actuator so as to reduce a comatic aberration caused by tracking the objective optical system.

12. The optical pickup apparatus of claim 10, wherein the movable lens group is driven to shift and/or tilt by the actuator so as to reduce a comatic aberration resulting from a tilt of the optical disk.

13. The optical pickup apparatus of claim 10, wherein the movable lens group is driven to be shifted to perpendicularly to the optical axis and/or to be tilted against the optical axis by the actuator in order to track an optical disk rotation.

14. The optical information recording and reproducing apparatus comprising the optical pickup apparatus of claim 1.

* * * * *